(12) United States Patent
Rosenflanz et al.

(10) Patent No.: US 10,988,399 B2
(45) Date of Patent: Apr. 27, 2021

(54) ARTICLES COMPRISING CRYSTALLINE MATERIALS AND METHOD OF MAKING THE SAME

(71) Applicant: 3M INNOVATIVE PROPERTIES COMPANY, St. Paul, MN (US)

(72) Inventors: Anatoly Z. Rosenflanz, Maplewood, MN (US); Jason D. Anderson, Richfield, MN (US); Noah O. Shanti, Maplewood, MN (US); Fabian Stolzenburg, Woodbury, MN (US); Jean A. Tangeman, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 204 days.

(21) Appl. No.: 15/976,392

(22) Filed: May 10, 2018

(65) Prior Publication Data

US 2018/0327300 A1    Nov. 15, 2018

Related U.S. Application Data

(60) Provisional application No. 62/505,377, filed on May 12, 2017.

(51) Int. Cl.

| C03B 19/06  | (2006.01) |
| C03C 10/00  | (2006.01) |
| C03C 12/00  | (2006.01) |
| C03C 3/062  | (2006.01) |
| C03B 23/00  | (2006.01) |
| C03B 32/02  | (2006.01) |
| C03B 23/025 | (2006.01) |

(Continued)

(52) U.S. Cl.
CPC ........ *C03B 19/063* (2013.01); *C03B 23/0013* (2013.01); *C03B 23/0256* (2013.01); *C03B 23/0302* (2013.01); *C03B 32/02* (2013.01); *C03C 3/062* (2013.01); *C03C 10/00* (2013.01); *C03C 10/0054* (2013.01); *C03C 12/00* (2013.01); *C03B 19/102* (2013.01); *C03C 2204/00* (2013.01)

(58) Field of Classification Search
None
See application file for complete search history.

(56) References Cited

U.S. PATENT DOCUMENTS

| 2,150,694 A | 3/1939 | Morey |
| 5,326,519 A | 7/1994 | Claussen |

(Continued)

FOREIGN PATENT DOCUMENTS

| WO | WO 2001/27046 | 4/2001 |
| WO | WO 2001/56948 | 8/2001 |

(Continued)

OTHER PUBLICATIONS

Kim, "A high-strain-rate superplastic ceramic", Nature, Sep. 20, 2001, vol. 413, pp. 288-291.

(Continued)

*Primary Examiner* — Erin Snelting

(57) ABSTRACT

Methods for making articles comprising crystalline material. Exemplary articles made by a method described herein include electronics enclosure (e.g., a watch case, cellular phone case, or a tablet case).

12 Claims, 3 Drawing Sheets

(51) Int. Cl.
*C03B 23/03* (2006.01)
*C03B 19/10* (2006.01)

(56) References Cited

U.S. PATENT DOCUMENTS

| | | | |
|---|---|---|---|
| 5,605,870 A | 2/1997 | Strom-Olsen | |
| 6,254,981 B1 | 7/2001 | Castle | |
| 6,461,988 B2 | 10/2002 | Budd | |
| 6,517,623 B1* | 2/2003 | Brodkin | C03C 4/0021 |
| | | | 106/35 |
| 7,101,819 B2 | 9/2006 | Rosenflanz | |
| 7,147,544 B2 | 12/2006 | Rosenflanz | |
| 7,168,267 B2 | 1/2007 | Rosenflanz | |
| 7,281,970 B2 | 10/2007 | Endres | |
| 7,297,171 B2 | 11/2007 | Rosenflanz | |
| 7,497,093 B2 | 3/2009 | Rosenflanz | |
| 7,501,000 B2 | 3/2009 | Rosenflanz | |
| 7,501,001 B2 | 3/2009 | Rosenflanz | |
| 7,507,268 B2 | 3/2009 | Rosenflanz | |
| 7,510,585 B2 | 3/2009 | Rosenflanz | |
| 7,563,293 B2 | 7/2009 | Rosenflanz | |
| 7,563,294 B2 | 7/2009 | Rosenflanz | |
| 7,598,188 B2 | 10/2009 | Rosenflanz | |
| 7,625,509 B2 | 12/2009 | Rosenflanz | |
| 7,655,586 B1* | 2/2010 | Brodkin | B82Y 30/00 |
| | | | 501/103 |
| 7,737,063 B2 | 6/2010 | Rosenflanz | |
| 8,003,217 B2 | 8/2011 | Rosenflanz | |
| 8,056,370 B2 | 11/2011 | Rosenflanz | |
| 2005/0137078 A1 | 6/2005 | Anderson | |
| 2007/0256454 A1 | 11/2007 | Rosenflanz | |
| 2007/0270299 A1 | 11/2007 | Rosenflanz | |
| 2011/0253582 A1 | 10/2011 | Lenius | |
| 2019/0099244 A1* | 4/2019 | Vollmann | A61C 13/0006 |
| 2020/0062638 A1* | 2/2020 | Engqvist | A61K 6/17 |

FOREIGN PATENT DOCUMENTS

| | | |
|---|---|---|
| WO | WO 2002/08146 | 1/2002 |
| WO | WO 2007/130853 | 11/2007 |

OTHER PUBLICATIONS

Rosenflanz, "Bulk glasses and ultrahard nanoceramics based on alumina and rare-earth oxides", Nature, Aug. 12, 2004, vol. 430, pp. 761-764.

Shishido, "Ln—M—O glasses obtained by rapid quenching using a laser beam", Journal of Materials Science, 1978, vol. 13, pp. 1006-1014.

Tatsumisago, "Infrared Spectra of Rapidly Quenched Glasses in the Systems $Li_2O$—RO—$Nb_2O_5$ (R=Ba, Ca, Mg)", Journal of the American Ceramic Society, 1983, vol. 66, No. 2, pp. 117-119.

Topol, "Formation of New Oxide Glasses by Laser Spin Melting and Free Fall Cooling", Journal of Non-Crystalline Solids, 1973, vol. 12, pp. 377-390.

Topol, "Formation of New Lanthanide Oxide Glasses by Laser Spin Melting and Free-Fall Cooling," Journal of Non-Crystalline Solids, 1974, vol. 15, pp. 116-124.

Glass-Ceramics, P. W. McMillan, Academic Press, Inc., New York, NY, 2nd edition, 1979, pp. 89-119.

Rapid Solidification of Ceramics: A Technology Assessment, Brockway et al., Metals and Ceramics Information Center, A Department of Defense Information Analysis Center, Columbus, OH, Jan. 1984, pp. 5-17.

* cited by examiner

ARTICLES COMPRISING CRYSTALLINE MATERIALS AND METHOD OF MAKING THE SAME

CROSS REFERENCE TO RELATED APPLICATION

This application claims the benefit of U.S. Provisional Patent Application No. 62/505,377, filed May 12, 2017, the disclosure of which is incorporated by reference herein in its entirety.

BACKGROUND

A large number of amorphous (including glass) and glass-ceramic compositions are known. The majority of oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glass compositions formed with these glass-formers can be heat-treated to form glass-ceramics. The upper use temperature of glasses and glass-ceramics formed from such glass formers is generally less than 1200° C., typically about 700-800° C. The glass-ceramics tend to be more temperature resistant than the glass from which they are formed. In addition, many properties of known glasses and glass-ceramics are limited by the intrinsic properties of glass-formers. For example, for $SiO_2$, $B_2O_3$, and $P_2O_5$-based glasses and glass-ceramics, the Young's modulus, hardness, and strength are limited by such glass-formers. Such glass and glass-ceramics generally have inferior mechanical properties as compared, for example, to $Al_2O_3$ or $ZrO_2$. Glass-ceramics having mechanical properties similar to that of $Al_2O_3$ or $ZrO_2$ would be desirable.

Shaping of ceramics into parts with intricate geometries is a laborious and expensive process. While many green body techniques such as pill-pressing, injection molding, slip-casting, gel-casting etc. have been devised, the issues associated with sintering to full densities (such as shrinkage, warpage, cracking) remain. In practicality, many ceramic articles are machined into a final shape in a fully dense state. Typically, the final surface finish is produced by grinding and polishing; various surface structures are also machined in. Machining and finishing in many cases can add up to 50% of a final cost of a ceramic and, therefore, undesirable. Novel ways to make near-net shaped parts with a minimum subsequent finishing are actively sought after.

Various pressure-assisted consolidation methods are known in the art and include hot-pressing, die-extrusion, hot-isostatic pressing, sinter-forging and variations of thereof. These consolidation methods are assisted by application of external force either directly through the use of punches as in hot-pressing, die-extrusion and sinter-forging, or indirectly through gas pressurization of a sealed container as in hot-isostatic pressing. In the latter method, the material to be consolidated is placed in a metal or glass container and evacuated and sealed from an atmosphere. The sealed material is mechanical pressed thereby isostatically pressurizing the container with gas and causing the container to shrink.

Glasses exhibiting glass transition temperature, $T_g$, can be successfully consolidated from glass powders into an article and, if desired, reshaped by heating to temperatures between $T_g$-$T_x$ range ($T_x$–crystallization temperature) (see, e.g., U.S. Pat. No. 7,625,509 (Rosenflanz et al.). In many instances, conversion of glasses to glass-ceramics is accompanied by shrinkage which is often undesirable.

SUMMARY

Surprisingly, Applicants have discovered methods for making articles comprising crystalline materials from nanocrystalline glass-ceramics, thus eliminating the majority of, or at least significantly reducing, shrinkage associated from glass to glass-ceramic conversion.

In one aspect, the present disclosure describes a first method for making an article comprising crystalline material, the method comprising:

heating nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic) particulate, at sufficient temperature and under sufficient pressure such that the nanocrystalline glass-ceramic particulate consolidates forming a shape having at least 90 (in some embodiments, at least 91, 92, 93, 94, 95, 96, 97, 98, or even at least 99) percent of theoretical density; and cooling the consolidated shape to provide the article. Typically, at least 90 (in some embodiments, at least 91, 92, 93, 94, 95, 96, 97, 98, 99, 99.5, 99.9, or even 100) percent by weight of the nanocrystalline glass-ceramic particulate, based on the total weight of the nanocrystalline glass-ceramic particulate, does not have a $T_g$.

In another aspect, the present disclosure describes a second method for making an article comprising crystalline material, the method comprising:

heating glass-ceramic particulate having an average microhardness of at least 9 (in some embodiments, at least 10, 11, 12, 13, or even at least 14) GPa at sufficient temperature and under sufficient pressure such that glass-ceramic particulate consolidates forming a shape having at least 90 (in some embodiments, at least 91, 92, 93, 94, 95, 96, 97, 98, or even at least 99) percent of theoretical density; and cooling the consolidated shape to provide the article. Typically, at least 90 (in some embodiments, at least 91, 92, 93, 94, 95, 96, 97, 98, 99, 99.5, 99.9, or even 100) percent by weight of the nanocrystalline glass-ceramic particulate, based on the total weight of the nanocrystalline glass-ceramic particulate, does not have a $T_g$. In some embodiments, the glass-ceramic particulate is nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic) particulate.

In another aspect, the present disclosure describes a third method of forming an article comprising:

providing a preform having a volume and a first shape, the preform comprising nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic);

providing a mold comprising a cavity having a void volume in the range of 70 to 130 percent of the volume of the preform;

placing at least a portion of the preform within the void volume of the mold; and heating the preform at sufficient temperature and sufficient pressure to form an article comprising crystalline material and having a second, different shape. The terms "first shape" and "second shape" in reference to the preform and reshaped body, respectively, refer to the three-dimensional shape as well as the dimensions of the respective article. That is, if the preform has a first shape that is a cylinder with a radius of 1 millimeter, and the reshaped body has a second shape that is a cylinder with a radius of 1.1 millimeter, the first and second shape are different from one another. Typically, at least 90 (in some embodiments, at least 91, 92, 93, 94, 95, 96, 97, 98, 99, 99.5, 99.9, or even 100) percent by weight of the nanocrystalline glass-ceramic, based on the total weight of the nanocrystalline glass-ceramic, does not have a $T_g$.

In another aspect, the present disclosure describes a fourth method of forming an article comprising:

providing a preform having a volume and a first shape, the preform comprising nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic);

providing a major surface;

placing at least a portion of the preform in contact with the templating surface; and heating the preform at sufficient temperature and sufficient pressure to form an article comprising crystalline material and having a second, different shape. Typically, at least 90 (in some embodiments, at least 91, 92, 93, 94, 95, 96, 97, 98, 99, 99.5, 99.9, or even 100) percent by weight of the nanocrystalline glass-ceramic, based on the total weight of the nanocrystalline glass-ceramic, does not have a $T_g$. In some embodiments, the method further comprising providing a second major surface opposing the first major surface, and placing at least a portion of the preform into contact with the second major surface. In some embodiments, the first shape is planar.

In this application:

"ceramic" includes amorphous material, glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"glass" refers to amorphous material exhibiting a glass transition temperature;

"glass-ceramic" refers to ceramic comprising crystals formed by heat-treating amorphous material;

"$T_g$" refers to the glass transition temperature as determined by the test described herein entitled "Differential Thermal Analysis;"

"$T_x$" refers to the crystallization temperature as determined by the test described herein entitled "Differential Thermal Analysis;"

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$.metal oxide, etc.) is crystalline, for example, in a glass-ceramic, it may be amorphous, crystalline, or portions amorphous and portions crystalline. For example if a glass-ceramic comprises $Al_2O_3$ and $ZrO_2$, the $Al_2O_3$ and $ZrO_2$ may each be in an amorphous state, crystalline state, or portions in an amorphous state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides.

Further, it is understood that glass-ceramics formed by heating amorphous material not exhibiting a $T_g$ may not actually comprise glass, but rather may comprise the crystals and amorphous material that does not exhibit a $T_g$.

Advantages of methods described herein may include minimal undesired shape changes during processing (e.g., shrinkage due to phase transformations or warping). Crystallization of a glass-ceramic material from the glass phase to the glass-ceramic phase can in some cases be accompanied by a strong exothermic event (as evident in a differential thermal analysis (DTA) scan) and significant amount of volume change (e.g., greater than 5% in any dimension) due to the elimination of the free space of the glass upon crystallization. Such volume change can in turn result in micro- or macro-crack formation or even total fracture of an article. Surprisingly, Applicants have discovered it is therefore advantageous to perform the consolidation and/or reshaping process in the glass-ceramic state after crystallization (or major crystallization) events have occurred in order to minimize the potential for undesirable effects such as shrinkage, warping, and/or cracking.

Exemplary articles made by a method described herein include electronics enclosure (e.g., a watch case, cellular phone case, or a tablet case).

DETAILED DESCRIPTION

Figure 1:
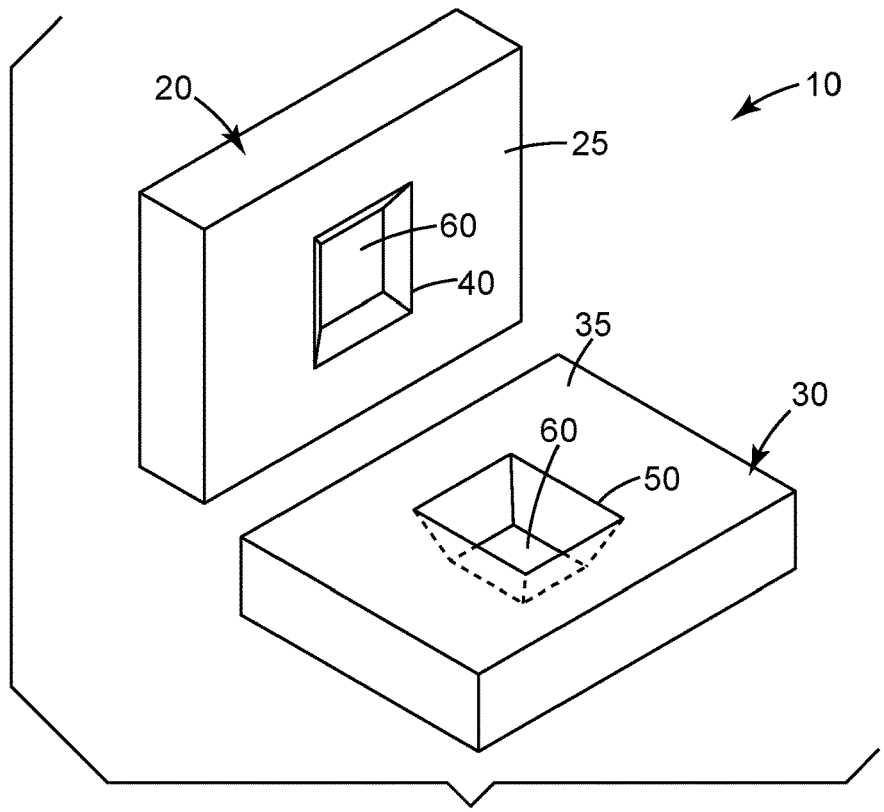
FIG. 1 is a perspective view of an exemplary molding apparatus useful in some embodiments described herein.

The first method for making the article comprising crystalline material comprises:

heating nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic) particulate, at sufficient temperature and under sufficient pressure such that the nanocrystalline glass-ceramic particulate consolidates forming a shape having at least 90 (in some embodiments, at least 91, 92, 93, 94, 95, 96, 97, 98, or even at least 99) percent of theoretical density; and cooling the consolidated shape to provide the article. Typically, at least 90 (in some embodiments, at least 91, 92, 93, 94, 95, 96, 97, 98, 99, 99.5, 99.9, or even 100) percent by weight of the nanocrystalline glass-ceramic particulate, based on the total weight of the nanocrystalline glass-ceramic particulate, does not have a $T_g$.

The second method for making an article comprising crystalline material comprises:

heating glass-ceramic particulate having an average microhardness of at least 9 (in some embodiments, at least 10, 11, 12, 13, or even at least 14) GPa at sufficient temperature and under sufficient pressure such that glass-ceramic particulate consolidates forming a shape having at least 90 (in some embodiments, at least 91, 92, 93, 94, 95, 96, 97, 98, or even at least 99) percent of theoretical density; and cooling the consolidated shape to provide the article. Typically, at least 90 (in some embodiments, at least 91, 92, 93, 94, 95, 96, 97, 98, 99, 99.5, 99.9, or even 100) percent by weight of the glass-ceramic particulate, based on the total weight of the glass-ceramic particulate, does not have a $T_g$. In some embodiments, the glass-ceramic particulate is nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic) particulate.

The third method for making the article comprising crystalline material comprises:

providing a preform having a volume and a first shape, the preform comprising nanocrystalline glass-ceramic;

providing a mold comprising a cavity having a void volume in the range of 70 to 130 percent of the volume of the preform;

placing at least a portion of the preform within the void volume of the mold; and heating the preform at sufficient temperature and at sufficient pressure to form an article comprising crystalline material and having a second, different shape. Typically, at least 90 (in some embodiments, at least 91, 92, 93, 94, 95, 96, 97, 98, 99, 99.9, or even 100) percent by weight of the nanocrystalline glass-ceramic, based on the total weight of the nanocrystalline glass-ceramic, does not have a $T_g$. In some embodiments, the cavity in the mold has a void volume in the range of 90 to 105 percent of the volume of the preform. In some embodiments, the mold further comprises at least one cavity port in fluid connection with the cavity.

The fourth method for making the article comprising crystalline material comprises:

providing a preform having a volume and a first shape, the preform comprising nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic);

providing a major surface;

placing at least a portion of the preform in contact with the templating surface; and heating the preform at sufficient temperature and sufficient pressure to form an article comprising crystalline material and having a second, different shape. Typically, at least 90 (in some embodiments, at least 91, 92, 93, 94, 95, 96, 97, 98, 99, 99.5, 99.9, or even 100) percent by weight of the nanocrystalline glass-ceramic, based on the total weight of the nanocrystalline glass-ceramic, does not have a $T_g$. In some embodiments, the method further comprising providing a second templating surface opposing the first, and placing at least a portion of the preform into contact with the opposing templating surface. In some embodiments, the first shape is planar.

In some embodiments, the major surface for the fourth method is planar, in others non-planar, while in others has both planar and non-planar regions. In some embodiments, the major surface for the fourth method is textured. In some embodiments, the major surface for the fourth method is in an open face mold. Exemplary materials that the major surface of for the fourth method may comprise ceramics (e.g., alumina, zirconia, and graphite).

Glass-ceramic particulate, including nanocrystalline glass-ceramic particulate, can be provided by techniques known in the art. Glass-ceramic particulate, including nanocrystalline glass-ceramic (e.g., particulate) can be provided by heat-treating amorphous material (e.g., glass) of the appropriate composition such that the amorphous material converts to a glass-ceramic.

Exemplary oxides, on a theoretical oxides basis, comprising the glass-ceramic, including nanocrystalline glass-ceramic, and/or crystalline material include $Al_2O_3$, $Y_2O_3$, $ZrO_2$, $HfO_2$, $Ga_2O_3$, REO, $Bi_2O_3$, MgO, $Nb_2O_5$, $Ta_2O_5$, CaO, BaO, or at least one transition metal oxide (e.g., oxides of Sc, Ti, V, Cr, Mn, Fe, Co, Ni, Cu, and Zn, $B_2O_3$, $GeO_2$, $SiO_2$, $TeO_2$, $As_2O_3$, $P_2O_5$, $TeO_2$, and complex metal oxides thereof).

In some embodiments, the glass-ceramic, including nanocrystalline glass-ceramic, and/or crystalline material comprises, on a theoretical oxides basis, $Al_2O_3$ (in some embodiments, at least 20, 25, 30, 35, 40, 45, 50, 55, 60, 65, 70, 75, 80, or even at least 85; in some embodiments, in a range from 20 to 85, 25 to 85, 35, to 85, or even 50 to 85 percent by weight $Al_2O_3$, based on the total weight of the glass-ceramic and/or crystalline material, respectively).

In some embodiments, the glass-ceramic, including nanocrystalline glass-ceramic, and/or crystalline material comprises, on a theoretical oxides basis, at least two of $Al_2O_3$, $Y_2O_3$, $ZrO_2$, $HfO_2$, $Ga_2O_3$, REO, $Bi_2O_3$, MgO, $Nb_2O_5$, $Ta_2O_5$, CaO, BaO, or at least one transition metal oxide (e.g., oxides of Sc, Ti, V, Cr, Mn, Fe, Co, Ni, Cu, and Zn, and complex metal oxides thereof).

In some embodiments, the nanocrystalline glass-ceramic and/or crystalline material comprises, on a theoretical oxides basis, $Al_2O_3$, REO, and at least one of $ZrO_2$ or $HfO_2$. In some embodiments, the glass-ceramic, including nanocrystalline glass-ceramic, and/or crystalline material collectively comprises, on a theoretical oxides basis, at least 70 (in some embodiments, at least 75, 80, 85, 90, 95, 96, 97, 98, 99, 99.5, or even 100) percent by weight of the $Al_2O_3$, REO, and at least one of $ZrO_2$ or $HfO_2$, based on the total weight of the glass-ceramic and/or crystalline material, respectively.

In some embodiments, the glass-ceramic, including nanocrystalline glass-ceramic, and/or crystalline material comprises, on a theoretical oxides basis, $Al_2O_3$, $Y_2O_3$, and at least one of $ZrO_2$ or $HfO_2$. In some embodiments, the glass-ceramic, including nanocrystalline glass-ceramic, and/or crystalline material collectively comprises, on a theoretical oxides basis, at least 70 (in some embodiments, at least 75, 80, 85, 90, 95, 96, 97, 98, 99, 99.5, or even 100) percent by weight of the $Al_2O_3$, $Y_2O_3$, and at least one of $ZrO_2$ or $HfO_2$, based on the total weight of the glass-ceramic and/or crystalline material, respectively.

In some embodiments, the glass-ceramic, including nanocrystalline glass-ceramic, and/or crystalline material collectively comprises, on a theoretical oxides basis, not more than 20 (in some embodiments, 15, 10, 5, 4, 3, 2, 1, or even 0) percent by weight $B_2O_3$, CaO, $GeO_2$, $SiO_2$, and $TeO_2$, based on the total weight of the glass-ceramic and/or crystalline material, respectively. In some embodiments, the glass-ceramic, including nanocrystalline glass-ceramic, and/or crystalline material collectively comprises, on a theoretical oxides basis, not more than 20 (in some embodiments, 15, 10, 5, 4, 3, 2, 1, or even 0) percent by weight, on a theoretical oxides basis, $As_2O_3$, $B_2O_3$, $GeO_2$, $P_2O_5$, $SiO_2$, $TeO_2$, and $V_2O_5$, based on the total weight of the glass-ceramic and/or crystalline material, respectively.

In some embodiments, the glass-ceramic, including nanocrystalline glass-ceramic, and/or crystalline material comprises at least one complex metal oxide (e.g., a complex $Al_2O_3$.metal oxide, a complex $Al_2O_3$.REO, and/or a complex $Al_2O_3$.$Y_2O_3$).

In some embodiments, the glass-ceramic, including nanocrystalline glass-ceramic, and/or crystalline material contains, on a theoretical oxides basis, no greater than 40 (in some embodiments, 35, 30, 25, 20, 15, 10, 5, 4, 3, 2, 1, or even 0) percent by weight $SiO_2$, based on the total weight of the glass-ceramic and/or crystalline material, respectively.

In some embodiments, the nanocrystalline glass-ceramic and/or crystalline material collectively contains, on a theoretical oxides basis, less than 40 (in some embodiments, 35, 30, 25, 20, 15, 10, 5, 4, 3, 2, 1, or even 0) percent by weight $SiO_2$, $B_2O_3$, and $P_2O_5$, based on the total weight of the glass-ceramic and/or crystalline material, respectively.

Suitable glass-ceramic particulate can be provided by techniques known in the in art. U.S. Pat. No. 7,563,294 (Rosenflanz), U.S. Pat. No. 7,501,000 (Rosenflanz et al.), U.S. Pat. No. 7,501,001 (Rosenflanz et al.), U.S. Pat. No. 7,168,267 (Rosenflanz et al.), U.S. Pat. No. 7,101,819 (Rosenflanz et al.), U.S. Pat. No. 7,147,544 (Rosenflanz), U.S. Pat. No. 7,510,585 (Rosenflanz), U.S. Pat. No. 7,563,293 (Rosenflanz), U.S. Pat. No. 7,737,063 (Rosenflanz), U.S. Pat. No. 7,507,268 (Rosenflanz), U.S. Pat. No. 8,056,370 (Rosenflanz et al.), U.S. Pat. No. 7,497,093 (Rosenflanz), U.S. Pat. No. 8,003,217 (Rosenflanz), U.S. Pat. No. 7,297,171 (Rosenflanz), U.S. Pat. No. 7,598,188 (Rosenflanz et al.), U.S. Pat. No. 7,281,970 (Endres et al.); U.S. Pat. Appl. Pub. Nos. 2007/0256454 (Rosenflanz et al.), 2007/0270299 (Rosenflanz et al.), and 2011/0253582 (Lenius et al.); and Rosenflanz et al., Bulk Glasses and Ultrahard Nanoceramics Based on Alumina and Rare-Earth Oxides, *Nature* 430, 761-64 (2004), the disclosures of which are incorporated herein by reference, report exemplary glass compositions that can be crystallized to provide the glass-ceramic, including nanocrystalline glass-ceramic, particulate. Exemplary glass-ceramic particulate or preforms can also be obtained by other techniques, such as direct melt casting, melt atomization, containerless levitation, laser spin melting, and other methods known to those skilled in the art (see, e.g., *Rapid Solidification of Ceramics*, Brockway et al., Metals And Ceramics Information Center, A Department of Defense Information Analysis Center, Columbus, Ohio, January, 1984).

Metal oxides that may be used to form the glass-ceramic particulate or preform include $Al_2O_3$; $TiO_2$; $Y_2O_3$; rare earth oxides (REO's) such as $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$ and $Yb_2O_3$; $ZrO_2$, $HfO_2$, $Ta_2O_5$, $Nb_2O_5$, $Bi_2O_3$, $WO_3$, $V_2O_5$, $Ga_2O_3$, and alkaline earth metal oxides (e.g., CaO and BaO). Examples of useful glass for carrying out the present disclosure include those comprising REO-$TiO_2$, REO-$ZrO_2$—$TiO_2$, REO-$Nb_2O_5$, REO-$Ta_2O_5$, REO-$Nb_2O_5$—$ZrO_2$, REO-$Ta_2O_5$—$ZrO_2$, CaO—$Nb_2O_5$, CaO—$Ta_2O_5$, BaO—$TiO_2$, REO-$Al_2O_3$, REO-$Al_2O_3$—$ZrO_2$, REO-$Al_2O_3$—$ZrO_2$—$SiO_2$, $Y_2O_3$—$Al_2O_3$—$ZrO_2$, $Y_2O_3$—$Al_2O_3$—$ZrO_2$—$SiO_2$, and SrO—$Al_2O_3$—$ZrO_2$ glasses. Useful glass formulations include those at or near a eutectic composition. In addition to these compositions and compositions also see, for example, U.S. Pat. No. 7,563,294 (Rosenflanz), U.S. Pat. No. 7,501,000 (Rosenflanz et al.), U.S. Pat. No. 7,501,001 (Rosenflanz et al.), U.S. Pat. No. 7,168,267 (Rosenflanz et al.), U.S. Pat. No. 7,101,819 (Rosenflanz et al.), U.S. Pat. No. 7,147,544 (Rosenflanz), U.S. Pat. No. 7,510,585 (Rosenflanz), U.S. Pat. No. 7,563,293 (Rosenflanz), U.S. Pat. No. 7,737,063 (Rosenflanz), U.S. Pat. No. 7,507,268 (Rosenflanz), U.S. Pat. No. 8,056,370 (Rosenflanz et al.), U.S. Pat. No. 7,497,093 (Rosenflanz), U.S. Pat. No. 8,003,217 (Rosenflanz), U.S. Pat. No. 7,297,171 (Rosenflanz), U.S. Pat. No. 7,598,188 (Rosenflanz et al.), U.S. Pat. No. 7,281,970 (Endres et al.); U.S. Pat. Appl. Pub. Nos. 2007/0256454 (Rosenflanz et al.), 2007/0270299 (Rosenflanz et al.), and 2011/0253582 (Lenius et al.); and Rosenflanz et al., Bulk glasses and ultrahard nanoceramics based on alumina and rare-earth oxides, *Nature* 430, 761-64 (2004), the disclosures if which are incorporated herein by reference, other compositions, including eutectic compositions, will be apparent to those skilled in the art after reviewing the present disclosure.

Additional examples of useful compositions for carrying out this disclosure may be found in U.S. Pat. No. 2,150,694 (Morey); Topol, L. E. et al, "Formation of new oxide glasses by laser spin melting and free fall cooling", J. Non-Crystal. Solids 12, 377-390 (1973); Topol, L. E., "Formation of new lanthanide oxide glasses by laser spin melting and free-fall cooling," J. Non-Crystall. Solids 15, 116-124 (1974); Shishido T., et al, in "Ln-M-O" glasses obtained by rapid quenching using laser beam, J. Mater. Sci. 13, 1006-1014 (1978); and Tatsumisago M. in "Infrared Spectra of Rapidly Quenched Glasses in the Systems, $Li_2O$—RO—$Nb_2O_5$ (R=Ba, Ca, Mg)," J. Amer. Ceram. Soc., Vol. 66, No. 2, pp. 117-119 (1983).

Amorphous materials (e.g., glasses), ceramics comprising the amorphous material, particles comprising the amorphous material, etc. that can be used as, or to provide glass-ceramic particulate, can be made, for example, by heating (including in a flame) the appropriate metal oxide sources to form a melt, desirably a homogenous melt, and then rapidly cooling the melt to provide amorphous material. Embodiments of amorphous materials can be made, for example, by melting the metal oxide sources in any suitable furnace (e.g., an inductive heated furnace, a gas-fired furnace, or an electrical furnace), or, for example, in a plasma. The resulting melt is cooled (e.g., discharging the melt into a cooling media (e.g., high velocity air jets, liquids, metal plates (including chilled metal plates), metal rolls (including chilled metal rolls), and metal balls (including chilled metal balls).

Embodiments of amorphous material can be made utilizing flame fusion as disclosed, for example, in U.S. Pat. No. 6,254,981 (Castle), the disclosure of which is incorporated herein by reference. In this method, the metal oxide source materials are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, or air. Feed particles can be formed, for example, by grinding, agglomerating (e.g., spray-drying), melting, or sintering the metal oxide sources. The size of feed particles fed into the flame generally determine the size of the resulting amorphous material comprising particles.

Embodiments of amorphous materials can also be obtained by other techniques, such as: laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et al., Metals And Ceramics Information Center, A Department of Defense Information Analysis Center, Columbus, Ohio, January, 1984, the disclosure of which is incorporated here as a reference). Embodiments of amorphous materials may also be obtained by other techniques, such as: thermal (including flame or laser or plasma-assisted) pyrolysis of suitable precursors, physical vapor synthesis (PVS) of metal precursors and mechanochemical processing.

Useful amorphous material formulations include those at or near a eutectic composition(s) (e.g., binary and ternary eutectic compositions). In addition to compositions disclosed herein, other compositions, including quaternary and other higher order eutectic compositions, may be apparent to those skilled in the art after reviewing the present disclosure.

Sources, including commercial sources, of, on a theoretical oxide basis, $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as at least one metal oxide other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials containing complex rare earth oxide and other metal oxides (e.g., $Dy_3Al_5O_{12}$, $CeAl_{11}O_{18}$, etc.).

Sources, including commercial sources, on a theoretical oxide basis, $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials containing complex $Y_2O_3$.metal oxides (e.g., $Y_3Al_5O_{12}$)).

Sources, including commercial sources, on a theoretical oxide basis, of $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as $HfO_2$. Sources, including commercial sources, on a theoretical oxide basis, of $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Other useful metal oxide may also include, on a theoretical oxide basis, BaO, CaO, $Cr_2O_3$, CoO, $Fe_2O_3$, $GeO_2$, $Li_2O$, MgO, MnO, NiO, $Na_2O$, $Sc_2O_3$, SrO, $TiO_2$, ZnO, and combinations thereof. Sources, including commercial sources, include the oxides themselves, complex oxides, ores, carbonates, acetates, nitrates, chlorides, hydroxides, etc. These metal oxides are added to modify a physical property of the resulting particles and/or improve processing. These metal oxides are typically added anywhere from 0% to 50% (in some embodiments, 0% to 25%) by weight of the glass-ceramic depending, for example, upon the desired property.

The particular selection of metal oxide sources and other additives for making ceramics according to the present disclosure typically takes into account, for example, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

In some instances, it may be desirable to incorporate limited amounts, on a theoretical oxides basis, other oxides such as $Na_2O$, $P_2O_5$, $SiO_2$, $TeO_2$, $V_2O_3$, and combinations thereof. Sources, including commercial sources, include the oxides themselves, complex oxides, ores, carbonates, acetates, nitrates, chlorides, hydroxides, etc. These metal oxides may be added, for example, to modify a physical property of the resulting particles and/or improve processing. These metal oxides when used are typically are added from greater than 0% to 20% (in some embodiments, 0% to 15%, 0% to 10%, 0% to 5%, or even 0% to 2%) by weight of the glass-ceramic depending, for example, upon the desired property.

In some embodiments, it may be advantageous for at least a portion of a metal oxide source (in some embodiments, at least 10, 15, 20, 25, 30, 35, 40, 45, or even at least 50 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof, to the melt, or otherwise melt them with the other raw materials. Although not wanting to be bound by theory, it is believed that the heat resulting from the exothermic reaction associated with the oxidation of the metal is beneficial in the formation of a homogeneous melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles with x, y, and z dimensions over 150 micrometers. It is also believed that the availability of the additional heat aids in driving various chemical reactions and physical processes (e.g., densification, and spheroidization) to completion. Further, it is believed for some embodiments, the presence of the additional heat generated by the oxidation reaction actually enables the formation of a melt, which otherwise is difficult or otherwise not practical due to high melting point of the materials.

The addition of certain metal oxides may alter the properties and/or crystalline structure or microstructure of the glass-ceramic and/or crystalline material, as well as the processing of the raw materials and intermediates in making the glass-ceramic. For example, oxide additions such as MgO, CaO, $Li_2O$, and $Na_2O$ have been observed to alter both the $T_g$ (for a glass) and $T_x$ (wherein $T_x$ is the crystallization temperature) of amorphous material. Although not wishing to be bound by theory, it is believed that such additions influence glass formation. Further, for example, such oxide additions may decrease the melting temperature of the overall system (i.e., drive the system toward lower melting eutectic), and ease of amorphous material-formation. Complex eutectics in multi component systems (quaternary, etc.) may result in better amorphous material-forming ability. The viscosity of the liquid melt and viscosity of the glass in its "working" range may also be affected by the addition of certain metal oxides such as MgO, CaO, $Li_2O$, and $Na_2O$. It is also within the scope of the present disclosure to incorporate at least one of halogens (e.g., fluorine and chlorine), or chalcogenides (e.g., sulfides, selenides, and tellurides) into the amorphous materials, and the glass-ceramics made therefrom.

Crystallization of the amorphous material and ceramic comprising the amorphous material may also be affected by the additions of certain materials. For example, certain metals, metal oxides (e.g., titanates and zirconates), and fluorides, for example, may act as nucleation agents resulting in beneficial heterogeneous nucleation of crystals. Also, addition of some oxides may change nature of metastable phases devitrifying from the amorphous material upon reheating. In another aspect, for ceramics comprising crystalline $ZrO_2$, it may be desirable to add metal oxides (e.g., $Y_2O_3$, $TiO_2$, CaO, and MgO) that are known to stabilize tetragonal/cubic form of $ZrO_2$.

The particular selection of metal oxide sources and other additives typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

The metal oxide sources and other additives can be in any form suitable to the process and equipment being used to make the glass-ceramics. The raw materials can be melted and quenched using techniques and equipment known in the art for making oxide amorphous materials and amorphous metals. Desirable cooling rates include those of 50 K/s and greater. Cooling techniques known in the art include roll-chilling. Roll-chilling can be carried out, for example, by melting the metal oxide sources at a temperature typically 20° C. to 200° C. higher than the melting point, and cooling/quenching the melt by spraying it under high pressure (e.g., using a gas such as air, argon, or nitrogen) onto a high-speed rotary roll(s). Typically, the rolls are made of metal and are water cooled. Metal book molds may also be useful for cooling/quenching the melt.

Other techniques for forming melts, cooling/quenching melts, and/or otherwise forming amorphous material include vapor phase quenching, melt-extraction, plasma spraying, and gas or centrifugal atomization. Vapor phase quenching can be carried out, for example, by sputtering, wherein the metal alloys or metal oxide sources are formed into a sputtering target(s) which are used. The target is fixed at a predetermined position in a sputtering apparatus, and a substrate(s) to be coated is placed at a position opposing the target(s). Typical pressures of $10^{-3}$ torr of oxygen gas and Ar gas, discharge is generated between the target(s) and a substrate(s), and Ar or oxygen ions collide against the target to start reaction sputtering, thereby depositing a film of composition on the substrate.

Gas atomization involves melting feed particles to convert them to melt. A thin stream of such melt is atomized through contact with a disruptive air jet (i.e., the stream is divided into fine droplets). The resulting substantially discrete, generally ellipsoidal amorphous material comprising particles (e.g., beads) are then recovered. Examples of bead sizes include those having a diameter in a range of about 5 micrometers to about 3 mm. Melt-extraction can be carried out, for example, as disclosed in U.S. Pat. No. 5,605,870 (Strom-Olsen et al.), the disclosure of which is incorporated herein by reference. Containerless glass forming techniques utilizing laser beam heating as disclosed, for example, in PCT Pub. No. WO 01/27046 A1, published Apr. 4, 2001, the disclosure of which is incorporated herein by reference, may also be useful in making the glass-ceramics.

The cooling rate is believed to affect the properties of the quenched amorphous material. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence amorphous material formation by influencing crystallization kinetics from undercooled liquid. For example, larger undercooling of $Al_2O_3$ melts without crystallization has been reported in argon atmosphere as compared to that in air.

The microstructure or phase composition (glassy/amorphous/crystalline) of a material can be determined in a number of ways. Various information can be obtained, for example, using optical microscopy, electron microscopy, differential thermal analysis (DTA), and x-ray diffraction (XRD).

Using optical microscopy, amorphous material is typically predominantly transparent due to the lack of light scattering centers such as crystal boundaries, while polycrystalline material shows a crystalline structure and is opaque due to light scattering effects.

A percent amorphous yield can be calculated for beads using a −100+120 mesh size fraction (i.e., the fraction collected between 150-micrometer opening size and 125-micrometer opening size screens). The measurements are done in the following manner. A single layer of beads is spread out upon a glass slide. The beads are observed using an optical microscope. Using the crosshairs in the optical microscope eyepiece as a guide, beads that lay along a straight line are counted either amorphous or crystalline depending on their optical clarity. A total of 500 beads are counted and a percent amorphous yield is determined by the amount of amorphous beads divided by total beads counted.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C. A glass transition temperature, $T_g$, is evident as an endothermic peak in a DTA scan according "Differential Thermal Analysis" in the Examples; the absence of an endothermic event indicates the absence of a glass transition (see, e.g., line 601 in FIG. 6).

Using powder x-ray diffraction, XRD, (using an x-ray diffractometer such as that obtained under the trade designation "PHILLIPS XRG 3100" from Phillips, Mahwah, N.J., with copper $K_{\alpha 1}$ radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material. The existence of both a broad peak and well-defined peaks is taken as an indication of existence of crystalline matter within an amorphous matrix.

The initially formed amorphous material or ceramic (including glass prior to crystallization) may be larger in size than that desired. The amorphous material or ceramic can be converted into smaller pieces using crushing and/or comminuting techniques known in the art, including roll crushing, canary milling, jaw crushing, hammer milling, ball milling, jet milling, and impact crushing. In some instances, it is desired to have two or multiple crushing steps. For example, after the ceramic is formed (solidified), it may be in the form of larger than desired material. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution, it may be necessary to perform multiple crushing steps. In general, the crushing conditions are optimized to achieve the desired particle shape(s) and particle size distribution. Resulting particles that are of the desired size may be recrushed if they are too large, or "recycled" and used as a raw material for re-melting if they are too small.

A preform may be formed, for example, by pouring or forming the melt into a mold, cool, and then crystallizing the resulting at least partially amorphous material. A preform may be formed, for example, by coalescing. Coalescing in essence forms a larger sized body from two or more smaller particles. For example, amorphous material comprising particles may be formed into a larger particle size. The temperature and pressure used for coalescing may depend, for example, upon composition of the amorphous material and the desired density of the resulting material. The temperature should be below the glass crystallization temperature, T, and for glasses, greater than the glass transition temperature. In some embodiments, the heating is conducted at at least one temperature in a range of about 850° C. to about 1100° C. (in some embodiments, 900° C. to 1000° C.). Typically, the amorphous material is under pressure (e.g., greater than zero to at least 1 GPa) during coalescence to aid the coalescence of the amorphous material. In one exemplary embodiment, a charge of particles is placed into a die and hot-pressing is performed at temperatures above glass transition where viscous flow of glass leads to coalescence into a relatively large body. Examples of typical coalescing techniques include hot pressing, hot isostatic pressure, and hot extrusion. Typically, it is generally desirable to cool the resulting coalesced body before further heat treatment. After heat treatment, if so desired, the coalesced body may be crushed to smaller particle sizes or a desired particle size distribution.

It is also within the scope of the present disclosure to conduct additional heat-treatment to further improve desirable properties of the material. For example, hot-isostatic pressing may be conducted (e.g., at temperatures from about 900° C. to about 1400° C.) to remove residual porosity, increasing the density of the material.

Coalescence of the amorphous material and/or glass-ceramic (e.g., particles) may also be accomplished by a variety of methods, including pressureless or pressure sintering (e.g., sintering, plasma assisted sintering, hot pressing, HIPing, hot forging, and hot extrusion).

Heat-treatment can be carried out in any of a variety of ways, including those known in the art for heat-treating amorphous material e.g., glass) to provide the glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material is fed directly into a kiln operating at the elevated temperature. The time at the elevated temperature may range from a few seconds (in some embodiments, even less than 5 seconds) to a few minutes to several hours. The temperature may range anywhere from 900° C. to 1600° C., typically between 1200° C. to 1500° C. It is also within the scope of the present disclosure to perform some of the heat-treatment in batches (e.g., for the nucleation step) and another continuous (e.g., for the crystal growth) step and to achieve the desired density. For the nucleation step, the temperature typically ranges between about 900° C. to about 1100° C. (in some embodiments, about 925° C. to about 1050° C.). Likewise, for the density step, the temperature typically is in a range from about 1100° C. to about 1600° C. (in some embodiments, about 1200° C. to about 1500° C.). This heat treatment may occur, for example, by feeding the material directly into a furnace at the elevated temperature. Alternatively, for example, the material may be fed into a furnace at a much lower temperature (e.g., room temperature) and then heated to desired temperature at a predetermined heating rate. It is within the scope of the present disclosure to conduct heat-treatment in an atmosphere other than air. In some cases, it might be even desirable to heat-treat in a reducing atmosphere(s). Also, for, example, it may be desirable to heat-treat under gas pressure as in, for example, hot-isostatic press, or in gas pressure furnace.

The amorphous material is heat-treated to at least partially crystallize the amorphous material to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure and the art should be able to provide TTT curves for the particular amorphous material, determine the appropriate nucleation and/or crystal growth conditions to provide the glass-ceramic.

Typically, glass-ceramics are stronger than the amorphous materials from which they are formed. Hence, the strength of the material may be adjusted, for example, by the degree to which the amorphous material is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example Glass-Ceramics, P. W. McMillan, Academic Press, Inc., $2^{nd}$ edition, 1979, the disclosure of which is incorporated herein by reference.

For example, during heat-treatment of some exemplary amorphous materials for making the glass-ceramics, formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the amorphous material. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10-15 nanometers have been observed. For at least some embodiments, heat-treatment at about 1300° C. for about 1 hour provides a full crystallization. In general, heat-treatment times for each of the nucleation and crystal growth steps may range from a few seconds (in some embodiments, even less than 5 seconds) to several minutes to an hour or more.

The size of the resulting crystals can typically be controlled at least in part by the nucleation and/or crystallization times and/or temperatures. Although it is generally desirable to have small crystals (e.g., on the order of not greater than a micrometer, or even not greater than a nanometer) glass-ceramics may be made with larger crystal sizes (e.g., at least 1-10 micrometers, at least 10-25 micrometers, or at least 50-100 micrometers). Although not wanting to be bound by theory, it is generally believed in the art that the finer the size of the crystals (for the same density), the higher the mechanical properties (e.g., hardness and strength) of the ceramic.

Examples of crystalline phases which may be present in embodiments of glass-ceramics according to the present disclosure include, on a theoretical oxides basis: $Al_2O_3$ (e.g., alpha-$Al_2O_3$), $Y_2O_3$, REO, $HfO_2$, $ZrO_2$ (e.g., cubic $ZrO_2$ and tetragonal $ZrO_2$), BaO, CaO, $Cr_2O_3$, CoO, $Fe_2O_3$, $GeO_2$, $Li_2O$, MgO, MnO, NiO, $Na_2O$, $P_2O_5$, $Sc_2O_3$, $SiO_2$, SrO, $TeO_2$, $TiO_2$, $V_2O_3$, $Y_2O_3$, ZnO, "complex metal oxides" (including "complex $Al_2O_3$.metal oxide (e.g., complex $Al_2O_3$.REO (e.g., $ReAlO_3$ (e.g., $GdAlO_3$.$LaAlO_3$), $ReAl_{11}O_{18}$ (e.g., $LaAl_{11}O_{18}$), and $Re_3Al_5O_{12}$ (e.g., $Dy_3Al_5O_{12}$)), complex $Al_2O_3$.$Y_2O_3$ (e.g., $Y_3Al_5O_{12}$), and complex $ZrO_2$.REO (e.g., $Re_2Zr_2O_7$ (e.g., $La_2Zr_2O_7$))), and combinations thereof.

It is also within the scope of the present disclosure to substitute a portion of the yttrium and/or aluminum cations in a complex $Al_2O_3$.metal oxide (e.g., complex $Al_2O_3$.$Y_2O_3$ (e.g., yttrium aluminate exhibiting a garnet crystal structure)) with other cations. For example, a portion of the Al cations in a complex $Al_2O_3$.$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3$.$Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Similarly, it is also within the scope of the present disclosure to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

It is also within the scope of the present disclosure to substitute a portion of the rare earth and/or aluminum cations in a complex $Al_2O_3$.metal oxide (e.g., complex $Al_2O_3$.REO) with other cations. For example, a portion of the Al cations in a complex $Al_2O_3$.REO may be substituted with at least one cation of an element selected from the group consisting of: Cr, Ti, Sc, Fe, Mg, Ca, Si, Co, and combinations thereof. For example, a portion of the Y cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. Similarly, it is also within the scope of the present disclosure to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

Typically, the nanocrystalline glass-ceramic particulate has a particle size of at least 20 (in some embodiments, at least 25, 30, 35, 40, 45, 50, 55, 60, 65, 70, or even 75; in some embodiments, in a range from 20 to 150, 50 to 120, 75 to 120, or even 75 to 100) micrometers.

Further in regard to the preform, the preform has a volume that approximates the finished product volume (i.e., within 30%). For example, the preform can be formed in a separate operation that focuses on the quality and consistency of the preform (e.g., elimination of defects associated with coalescing operations).

In some embodiments, heating in the second or third method with respect to reshaping the preform, is conducted at least one temperature in a range of about 1000° C. to about 1300° C.

During the reshaping process, the preform is placed into the mold and subjected to at least an applied pressure in a range from 0.1 MPa to 100 MPa (in some embodiments, 1

MPa to 50 MPa, or even 3 MPa to 25 MPa) and at least a temperature in a range from 1000° C. to 1300° C. (in some embodiments, 1050° C. to 1300° C., 1100° C. to 1300° C., 1150° C. to 1300° C., 1150° C. to 1250° C., or even 1200° C. to 1300° C.) for at least a time in a range from 1 second to 100 minutes to reshape the preform. Once the desired shaped is formed, it can be removed from the mold.

FIG. 1 is a perspective view of an exemplary molding apparatus useful in some embodiments of the present disclosure. As shown in FIG. 1, mold apparatus 10 comprises first mold portion 20 and second mold portion 30. First mold portion 20 has mold surface 25 with recessed portion 40. Second mold portion 30 has mold surface 35 with recessed portion 50. When mold surface 25 of first mold portion 20 and mold surface 35 of second mold portion 30 are aligned and contacted, a cavity is formed having a void volume.

Figure 2:
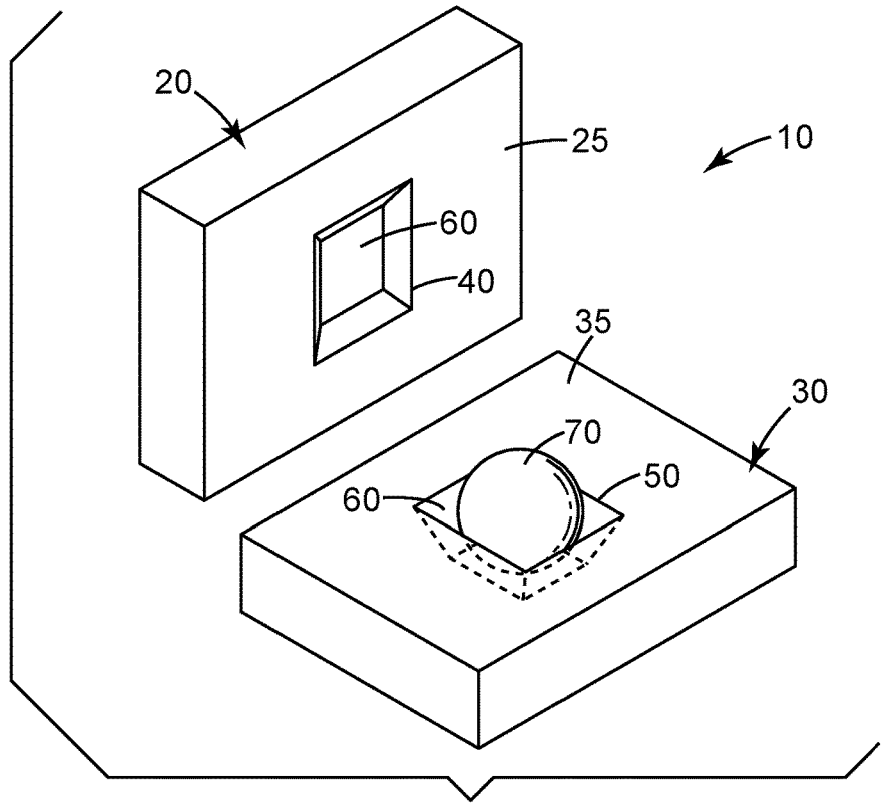
FIG. 2 is a perspective view of the exemplary molding apparatus shown in FIG. 1 having a preform positioned in at least a portion of the mold cavity.

FIG. 2 is a perspective view of the exemplary molding apparatus shown in FIG. 1 with a preform staged for reshaping. As shown in FIG. 2, preform 70 is positioned in at least a portion of recessed portion 50 of second mold portion 30. After inserting preform 70 in the mold apparatus 10, mold surface 25 and mold surface 35 are positioned opposite one another and a force is applied to maintain contact between preform 70 and each of recessed portions 40, 50. Preform 70 is then subjected to heating while pressure is applied to molding apparatus 10 to force mold surfaces 25, 35 toward one another. The heating and applied pressure cause preform 70 to deform and generally assume the shape of mold cavity 60.

The molding apparatus and the hot-pressing equipment used to apply heat and pressure can be any variety known to those skilled in the art. In some embodiments, at least a portion of the surface of the mold is prepared to provide an optically smooth surface to the reshaped article using techniques known to those skilled in the art. In some embodiments, at least a portion of the surface of the mold imparts a pattern, small features, or desired surface finish to the reshaped article.

Figure 3:
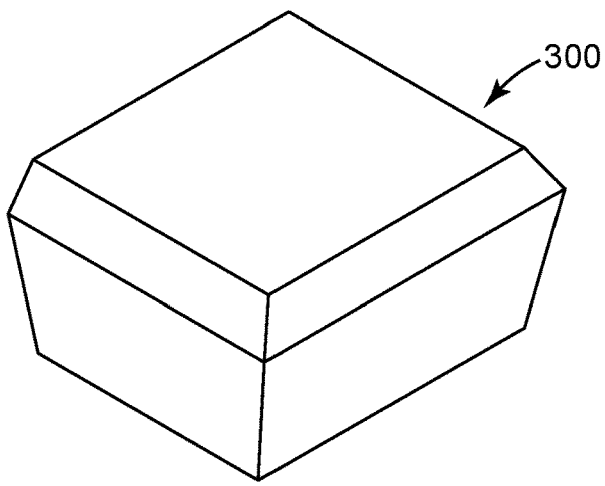
FIG. 3 is a perspective view of an exemplary article formed from the exemplary molding apparatus shown in FIG. 1.

FIG. 3 is a perspective view of an exemplary article from the exemplary molding apparatus shown in FIG. 1. As shown in FIG. 3, the article 300 has assumed substantially the same shape as the mold cavity because the preform had substantially the same volume as the mold cavity.

Figure 4:
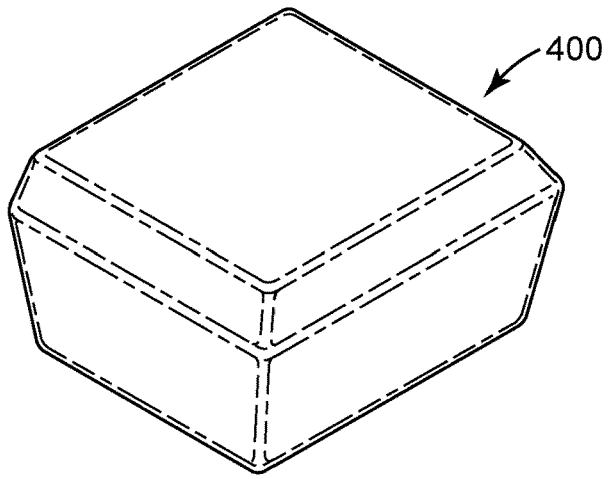
FIG. 4 is a perspective view of another exemplary article formed from the exemplary molding apparatus shown in FIG. 1.

FIG. 4 is a perspective view of an exemplary article from the exemplary molding apparatus shown in FIG. 1, wherein the preform had less volume than the mold cavity. As shown in FIG. 4, the body 400 assumed the same general shape of the mold cavity, but all of the outer edges contain radii due to the volume difference between the glass body preform and the mold cavity.

To achieve the desired reshaping, the void volume of the mold cavity is in the range of 70 to 130 percent of the volume of the preform. In some embodiments, the void volume of the mold cavity is at least 75 (or 80, 85, 90, 95, or even 100) percent of the volume of the preform. In some embodiment, the void volume of the mold cavity is 105 (or 110, 115, 120, 125, or even 130) percent of the volume of the preform. In some embodiments, the volume of the preform and the void volume of the mold cavity are substantially equal (i.e., less than 3% difference).

Figure 5:
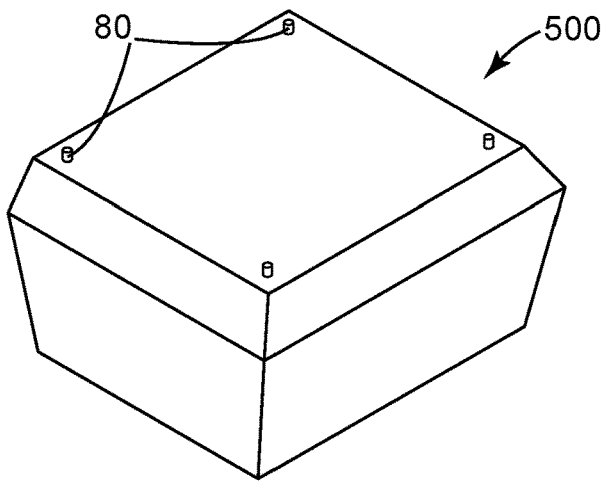
FIG. 5 is a perspective view of another exemplary article formed from the exemplary molding apparatus shown in FIG. 1.

FIG. 5 is a perspective view of an exemplary article from the exemplary molding apparatus shown in FIG. 1 and a preform having more volume than the mold cavity. As shown in FIG. 5, reshaped article 500 contains flash 80. In the context of the present disclosure, "flash" refers to any excess material that is formed with and attached to the reshaped article and is present only because of limitations in the molding process, and is otherwise undesirable. In some embodiments, the flash is removed in a subsequent operation, such as, for example, a machining operation. In other embodiments, it is not necessary to remove the flash prior to utilizing the reshaped article.

In the context of the present disclosure, the term "void volume" of the cavity refers to the total volume of the cavity as determined when the portions of the mold (i.e., the components of the mold that move relative to one another to "open" and "close" the mold, or otherwise apply pressure to the preform), are at their most intimate position achieved when reshaping the preform, less any "cavity port volume." The term "cavity port volume" refers to any void feature in fluid communication with the cavity, such as, for example, holes, channels, slots, parting spaces, or other voids that do not affect the desired shape of the reshaped article except to the extent that the features correspond with flash. The features that make up the cavity port volume may exist for a number of reasons, including, for example, to transfer gases into or out of the mold, as passages for ejectors, or as flash volume for excess preform glass material.

The shape of the preform can be any geometric shape. In some embodiments, the preform is planar. In some embodiments, the preform approximates the shape of the desired reshaped article to reduce the amount of reshaping that must occur. In some embodiments, multiple reshaping operations are conducted to achieve the desired shape. In yet further embodiments, additional preforms can be added during a shaping or reshaping process to prepare articles with regions that vary in properties (e.g., color, composition, crystallinity, hardness, transparency, etc.). The regions can represent layers or discrete portions within the finished article.

The second or third method described herein can be used to reshape small preforms (i.e., less than about 10 mm$^3$) or larger preforms (i.e., greater than about 10 mm$^3$).

In some embodiments, the second or third method described herein can be used to form an array of reshaped glass-ceramic bodies (e.g., at least a two by two matrix) that can be reshaped in either a batch or continuous process. The array of cavities used to form the array of reshaped articles can optionally be connected to one another to form a connected array of reshaped articles.

In some embodiments, the heating in the first, second, or third method, with respect to consolidating or reshaping the glass-ceramic, is conducted in a range from 1000° C. to 1300° C. (in some embodiments, in a range from 1050° C. to 1300° C., 1100° C. to 1300° C., 1150° C. to 1300° C., 1150° C. to 1250° C., or even 1200° C. to 1300° C.).

In some embodiments, the heating in the first, second, or third method, with respect to consolidating or reshaping the glass-ceramic, is conducted at a temperature at least 100 (in some embodiments at least 150, 200, 250, 300, 350 or even 400; in some embodiments in a range from 100 to 400, 200 to 400, 200 to 300, or even 250 to 350) ° C. above the crystallization temperature ($T_x$, as measured by DTA) of the glass in the glass-ceramic.

In some embodiments, at least of portion of the heating in the first, second, or third method, with respect to consolidating or reshaping the glass-ceramic, is conducted at pressure at least 0.1 MPa (in some embodiments, at least 0.2 MPa, 0.5 MPa, 1 MPa, 5 MPa, 10 MPa, 25 MPa, 50 MPa, 100 MPa, or even at least 200 MPa; in some embodiments, in a range from 0.1 MPa to 200 MPa, 0.2 MPa to 200 MPa, 0.5 MPa to 200 MPa, 1 MPa to 200 MPa, 5 MPa to 200 MPa, or even 10 MPa to 200 MPa).

In some embodiments, the heating in the first, second, third, or fourth method, with respect to consolidating or reshaping the glass-ceramic, is conducted for a time of at least 30 seconds (in some embodiments, at least 45 seconds, 1 minute, or even at least 1 hour; in some embodiments, in a range from 30 seconds to 1 hour, 45 seconds to 1 hour, or even 1 minute to 1 hour).

In some embodiments, the crystalline material has an average crystallite size of at least 20 nanometers (nm), 25 nm, 30 nm, 35 nm, 40 nm, 45 nm, 50 nm, 55 nm, 60 nm, 65 nm, 70 nm, 75 nm, 100 nm, 150 nm, 200 nm, or even at least 300 nm; in some embodiments, in a range from 20 nm to 300 nm (in some embodiments, in a range from 20 nm to 200 nm, 20 nm to 100 nm, 20 nm to 75 nm, or even 20 nm to 60 nm). In some embodiments, the crystalline material is nanocrystalline.

The average crystal size of a glass-ceramic and/or crystalline material can be determined by the line intercept method according to the ASTM standard E112-96 "Standard Test Methods for Determining Average Grain Size." The sample is mounted in mounting resin (such as that obtained under the trade designation "TRANSOPTICPOWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as the JEOL SEM Model JSM 840A). A typical back-scattered electron (BSE) micrograph of the microstructure found in the sample is used to determine the average crystal size as follows. The number of crystals that intersect per unit length ($N_L$) of a random straight line drawn across the micrograph are counted. The average crystal size is determined from this number using the following equation.

Average Crystal Size=$1.56 \times N_L M$, where $N_L$ is the number of crystals intersected per unit length and M is the magnification of the micrograph.

Crystals formed by heat-treating amorphous to provide the glass-ceramic may have, for example, equiaxed, columnar, or flattened splat-like features. The crystalline material may also have, for example, equiaxed, columnar or flattened splat-like features.

Typically, the (true) density, sometimes referred to as specific gravity, of the glass-ceramic and/or crystalline material is typically at least 70% (in some embodiments, at least 75%, 80%, 85%, 90%, 92%, 95%, 96%, 97%, 98%, 99%, 99.5% or even 100%) of theoretical density.

In some embodiments, the glass-ceramic and/or crystalline material has an average microhardness, based on 20 measurements, of at least 9 GPa, (in some embodiments, at least 10 GPa, 11 GPa, 12 GPA, 13 GPa, 14 GPa, 15 GPa, 16 GPa, 17 GPa, or even at least 18 GPa). The average microhardness of the glass-ceramic and/or crystalline material can be determined as follows. Sections of the material are mounted in mounting resin (obtained under the trade designation "TRANSOPTIC POWDER" from Buehler, Ltd., Lake Bluff, Ill.) typically in a cylinder of resin about 2.5 cm in diameter and about 1.9 cm high. The mounted section is prepared using conventional polishing techniques using a polisher (such as that obtained from Buehler, Ltd. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference.

Articles made by methods described herein typically have x, y, and z dimensions each perpendicular to each other, and wherein each of the x, y, and z dimensions is at least 0.5 (in some embodiments at least 1, 2, 3, 4 or even at least 5) millimeter. In some embodiments, the x and y dimensions are at least 1, 2, 3, 4, or even at least 5 millimeters, and the z dimension is at least 0.1, 0.2, 0.3, 0.4 or even at least 0.5 millimeter. The x, y, and z dimensions of a material are determined either visually or using microscopy, depending on the magnitude of the dimensions. The reported z dimension is, for example, the diameter of a sphere, the thickness of a coating, or the longest length of a prismatic shape.

Exemplary articles made by a method described herein include electronics enclosure (e.g., a watch case, cellular phone case, or a tablet case).

EXEMPLARY EMBODIMENTS

1A. A method for making an article comprising crystalline material, the method comprising:

heating nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic) particulate, at sufficient temperature and under sufficient pressure such that the nanocrystalline glass-ceramic particulate consolidates forming a shape having at least 90 (in some embodiments, at least 91, 92, 93, 94, 95, 96, 97, 98, or even at least 99) percent of theoretical density; and cooling the consolidated shape to provide the article.

2A. The method of Exemplary Embodiment 1A, wherein at least 90 (in some embodiments, at least 91, 92, 93, 94, 95, 96, 97, 98, 99, 99.5, 99.9, or even 100) percent by weight of the nanocrystalline glass-ceramic particulate, based on the total weight of the nanocrystalline glass-ceramic particulate, does not have a $T_g$.

3A. The method of any preceding A Exemplary Embodiment, wherein, the nanocrystalline glass-ceramic particulate has a particle size at least 20 (in some embodiments, at least 25, 30, 35, 40, 45, 50, 55, 60, 65, 70, or even 75; in some embodiments, in a range from 20 to 150, 50 to 120, 75 to 120, or even 75 to 100) micrometers. In some embodiments, nanocrystalline glass-ceramic particulate has a bimodal distribution of particle sizes.

4A. The method of any preceding A Exemplary Embodiment, wherein the nanocrystalline glass-ceramic particulate (and/or crystalline material) contains, on a theoretical oxides basis, no greater than 40 (in some embodiments, 35, 30, 25, 20, 15, 10, 5, 4, 3, 2, 1, or even 0) percent by weight $SiO_2$, based on the total weight of the nanocrystalline glass-ceramic particulate (and/or crystalline material, respectively).

5A. The method of any preceding A Exemplary Embodiment, wherein the nanocrystalline glass-ceramic particulate (and/or crystalline material) collectively contains, on a theoretical oxides basis, less than 40 (in some embodiments, 35, 30, 25, 20, 15, 10, 5, 4, 3, 2, 1, or even 0) percent by weight $SiO_2$, $B_2O_3$, and $P_2O_5$, based on the total weight of the nanocrystalline glass-ceramic particulate (and/or crystalline material, respectively).

6A. The method of any preceding A Exemplary Embodiment, wherein the heating is conducted in a range from 1000° C. to 1300° C. (in some embodiments, in a range from 1050° C. to 1300° C., 1100° C. to 1300° C., 1150° C. to 1300° C., 1150° C. to 1250° C., or even 1200° C. to 1300° C.).

7A. The method of any preceding A Exemplary Embodiment, wherein at least a portion of the heating is conducted at pressure at least 0.1 MPa (in some embodiments, at least 0.2 MPa, 0.5 MPa, 1 MPa, 5 MPa, 10 MPa, 25 MPa, 50 MPa, 100 MPa, or even at least 200 MPa; in some embodiments, in a range from 0.1 MPa to 200 MPa, 0.2 MPa to 200 MPa, 0.5 MPa to 200 MPa, 1 MPa to 200 MPa, 5 MPa to 200 MPa, or even 10 MPa to 200 MPa).

8A. The method of any preceding A Exemplary Embodiment, wherein the heating is conducted for a time of at least 30 seconds (in some embodiments, at least 45 seconds, 1 minute, or even at least 1 hour; in some embodiments, in a range from 30 seconds to 1 hour, 45 seconds to 1 hour, or even 1 minute to 1 hour).

9A. The method of any preceding A Exemplary Embodiment, wherein the crystalline material has an average crystallite size of at least 20 nanometers (nm), 25 nm, 30 nm, 35 nm, 40 nm, 45 nm, 50 nm, 55 nm, 60 nm, 65 nm, 70 nm, 75 nm, 100 nm, 150 nm, 200 nm, or even at least 300 nm; in some embodiments, in a range from 20 nm to 300 nm (in some embodiments, in a range from 20 nm to 200 nm, 20 nm to 100 nm, 20 nm to 75 nm, or even 20 nm to 60 nm).

10A. The method of any of Exemplary Embodiments 1A to 8A, wherein the crystalline material is nanocrystalline.

11A. The method of any preceding A Exemplary Embodiment, wherein the nanocrystalline glass-ceramic particulate (and/or crystalline material) collectively comprises, on a theoretical oxides basis, $Al_2O_3$ (in some embodiments, at least 20, 25, 30, 35, 40, 45, 50, 55, 60, 65, 70, 75, 80, or even at least 85; in some embodiments, in a range from 20 to 85, 25 to 85, 35, to 85, or even 50 to 85 percent by weight $Al_2O_3$, based on the total weight of the nanocrystalline glass-ceramic particulate (and/or crystalline material, respectively)).

12A. The method of any of Exemplary Embodiments 1A to 10A, wherein the nanocrystalline glass-ceramic particulate (and/or crystalline material) comprises, on a theoretical oxides basis, $Al_2O_3$, REO, and at least one of $ZrO_2$ or $HfO_2$.

13A. The method of Exemplary Embodiment 12A, wherein the nanocrystalline glass-ceramic particulate (and/or crystalline material) collectively comprises, on a theoretical oxides basis, at least 70 (in some embodiments, at least 75, 80, 85, 90, 95, 96, 97, 98, 99, 99.5, or even 100) percent by weight of the $Al_2O_3$, REO, and at least one of $ZrO_2$ or $HfO_2$, based on the total weight of the nanocrystalline glass-ceramic particulate (and/or crystalline material, respectively).

14A. The method of any of Exemplary Embodiments 1A to 10A, wherein the nanocrystalline glass-ceramic particulate (and/or crystalline material) comprises, on a theoretical oxides basis, $Al_2O_3$, $Y_2O_3$, and at least one of $ZrO_2$ or $HfO_2$.

15A. The method of Exemplary Embodiment 14A, wherein the nanocrystalline glass-ceramic particulate (and/or crystalline material) collectively comprises, on a theoretical oxides basis, at least 70 (in some embodiments, at least 75, 80, 85, 90, 95, 96, 97, 98, 99, 99.5, or even 100) percent by weight of the $Al_2O_3$, $Y_2O_3$, and at least one of $ZrO_2$ or $HfO_2$, based on the total weight of the nanocrystalline glass-ceramic particulate (and/or crystalline material, respectively).

16A. The method of any of Exemplary Embodiments 1A to 10A, wherein the nanocrystalline glass-ceramic particulate (and/or crystalline material) comprises, on a theoretical oxides basis, at least two of $Al_2O_3$, $Y_2O_3$, $ZrO_2$, $HfO_2$, $Ga_2O_3$, REO, $Bi_2O_3$, MgO, $Nb_2O_5$, $Ta_2O_5$, CaO, or at least one transition metal oxide (e.g., e.g., oxides of Sc, Ti, V, Cr, Mn, Fe, Co, Ni, Cu, and Zn, and complex metal oxides thereof).

17A. The method of any of preceding A Exemplary Embodiment, wherein the nanocrystalline glass-ceramic particulate (and/or crystalline material) collectively comprises, on a theoretical oxides basis, not more than 20 (in some embodiments, 15, 10, 5, 4, 3, 2, 1, or even 0) percent by weight $B_2O_3$, CaO, $GeO_2$, $SiO_2$, and $TeO_2$, based on the total weight of the nanocrystalline glass-ceramic particulate (and/or crystalline material, respectively).

18A. The method of any of preceding A Exemplary Embodiment, wherein the nanocrystalline glass-ceramic particulate (and/or crystalline material) collectively comprises, on a theoretical oxides basis, not more than 20 (in some embodiments, 15, 10, 5, 4, 3, 2, 1, or even 0) percent by weight $As_2O_3$, $B_2O_3$, $GeO_2$, $P_2O_5$, $SiO_2$, $TeO_2$, and $V_2O_5$, based on the total weight of the nanocrystalline glass-ceramic particulate (and/or crystalline material, respectively).

19A. The method of any preceding A Exemplary Embodiment, wherein the nanocrystalline glass-ceramic particulate (and/or crystalline material) comprises at least one complex metal oxide (e.g., a complex $Al_2O_3$.metal oxide, a complex $Al_2O_3$.REO, and/or a complex $Al_2O_3$.$Y_2O_3$).

20A. The method of any preceding A Exemplary Embodiment, wherein the heating is conducted at a temperature at least 100 (in some embodiments at least 150, 200, 250, 300, 350 or even 400; in some embodiments in a range from 100 to 400, 200 to 400, 200 to 300, or even 250 to 350) ° C. above the crystallization temperature glass in the glass-ceramic.

21A. The method of any preceding A Exemplary Embodiment, wherein the embodiment has x, y, and z dimensions each perpendicular to each other, and wherein each of the x, y, and z dimensions is at least 0.5 (in some embodiments at least 1, 2, 3, 4 or even at least 5) millimeters. In some embodiments, the x and y dimensions are at least 1, 2, 3, 4, or even at least 5 millimeters, and the z dimension is at least 0.1, 0.2, 0.3, 0.4 or even at least 0.5 millimeter.

22A. The method of any preceding A Exemplary Embodiment, wherein the article is an electronics enclosure (e.g., a watch case, cellular phone case, or a tablet case).

23A. An article made according any preceding A Exemplary Embodiment.

1B. A method for making an article comprising crystalline material, the method comprising:

heating glass-ceramic particulate having a microhardness of at least 9 (in some embodiments, at least 10, 11, 12, 13, or even at least 14) GPa at sufficient temperature and under sufficient pressure such that glass-ceramic particulate consolidates forming a shape having at least 90 (in some embodiments, at least 91, 92, 93, 94, 95, 96, 97, 98, or even at least 99) percent of theoretical density; and cooling the consolidated shape to provide the article.

2B. The method of Exemplary Embodiment 1B, wherein the glass-ceramic particulate comprises nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic) particulate.

3B. The method of any preceding B Exemplary Embodiment, wherein at least 90 (in some embodiments, at least 91, 92, 93, 94, 95, 96, 97, 98, 99, 99.5, 99.9, or even 100) percent by weight of the glass-ceramic particulate, based on the total weight of the glass-ceramic particulate, does not have a $T_g$.

4B. The method of any preceding B Exemplary Embodiment, wherein, the glass-ceramic particulate has a particle size at least 20 (in some embodiments, at least 25, 30, 35, 40, 45, 50, 55, 60, 65, 70, or even 75; in some embodiments, in a range from 20 to 150, 50 to 120, 75 to 120, or even 75 to 100) micrometers. In some embodiments, glass-ceramic particulate has a bimodal distribution of particle sizes.

5B. The method of any preceding B Exemplary Embodiment, wherein the glass-ceramic particulate (and/or crystalline material) contains, on a theoretical oxides basis, no greater than 40 (in some embodiments, 35, 30, 25, 20, 15, 10, 5, 4, 3, 2, 1, or even 0) percent by weight $SiO_2$, based on the total weight of the glass-ceramic particulate (and/or crystalline material, respectively).

6B. The method of any preceding B Exemplary Embodiment, wherein the glass-ceramic particulate (and/or crystalline material) collectively contains, on a theoretical oxides basis, less than 40 (in some embodiments, 35, 30, 25, 20, 15, 10, 5, 4, 3, 2, 1, or even 0) percent by weight $SiO_2$, $B_2O_3$, and $P_2O_5$, based on the total weight of the glass-ceramic particulate (and/or crystalline material, respectively).

7B. The method of any preceding B Exemplary Embodiment, wherein the heating is conducted in a range from 1000° C. to 1300° C. (in some embodiments, in a range from 1050° C. to 1300° C., 1100° C. to 1300° C., 1150° C. to 1300° C., 1150° C. to 1250° C., or even 1200° C. to 1300° C.).

8B. The method of any preceding B Exemplary Embodiment, wherein at least a portion of the heating is conducted at pressure at least 0.1 MPa (in some embodiments, at least 0.2 MPa, 0.5 MPa, 1 MPa, 5 MPa, 10 MPa, 25 MPa, 50 MPa, 100 MPa, or even at least 200 MPa; in some embodiments, in a range from 0.1 MPa to 200 MPa, 0.2 MPa to 200 MPa, 0.5 MPa to 200 MPa, 1 MPa to 200 MPa, 5 MPa to 200 MPa, or even 10 MPa to 200 MPa).

9B. The method of any preceding B Exemplary Embodiment, wherein the heating is conducted for a time of at least 30 seconds (in some embodiments, at least 45 seconds, 1 minute, or even at least 1 hour; in some embodiments, in a range from 30 seconds to 1 hour, 45 seconds to 1 hour, or even 1 minute to 1 hour).

10B. The method of any preceding B Exemplary Embodiment, wherein the crystalline material has an average crystallite size of at least 20 nanometers (nm), 25 nm, 30 nm, 35 nm, 40 nm, 45 nm, 50 nm, 55 nm, 60 nm, 65 nm, 70 nm, 75 nm, 100 nm, 150 nm, 200 nm, or even at least 300 nm; in some embodiments, in a range from 20 nm to 300 nm (in some embodiments, in a range from 20 nm to 200 nm, 20 nm to 100 nm, 20 nm to 75 nm, or even 20 nm to 60 nm).

11B. The method of any of Exemplary Embodiments 1B to 9B, wherein the crystalline material is nanocrystalline.

12B. The method of any preceding B Exemplary Embodiment, wherein the glass-ceramic particulate (and/or crystalline material) collectively comprises, on a theoretical oxides basis, $Al_2O_3$ (in some embodiments, at least 20, 25, 30, 35, 40, 45, 50, 55, 60, 65, 70, 75, 80, or even at least 85; in some embodiments, in a range from 20 to 85, 25 to 85, 35, to 85, or even 50 to 85 percent by weight $Al_2O_3$, based on the total weight of the glass-ceramic particulate (and/or crystalline material, respectively)).

13B. The method of any of Exemplary Embodiments 1B to 11B, wherein the glass-ceramic (and/or crystalline material) comprises, on a theoretical oxides basis, $Al_2O_3$, REO, and at least one of $ZrO_2$ or $HfO_2$.

14B. The method of Exemplary Embodiment 13B, wherein the glass-ceramic particulate (and/or crystalline material) collectively comprises, on a theoretical oxides basis, at least 70 (in some embodiments, at least 75, 80, 85, 90, 95, 96, 97, 98, 99, 99.5, or even 100) percent by weight of the $Al_2O_3$, REO, and at least one of $ZrO_2$ or $HfO_2$, based on the total weight of the glass-ceramic particulate (and/or crystalline material, respectively).

15B. The method of any of Exemplary Embodiments 1B to 11B, wherein the glass-ceramic particulate (and/or crystalline material) comprises, on a theoretical oxides basis, $Al_2O_3$, $Y_2O_3$, and at least one of $ZrO_2$ or $HfO_2$.

16B. The method of Exemplary Embodiment 15B, wherein the glass-ceramic particulate (and/or crystalline material) collectively comprises, on a theoretical oxides basis, at least 70 (in some embodiments, at least 75, 80, 85, 90, 95, 96, 97, 98, 99, 99.5, or even 100) percent by weight of the $Al_2O_3$, $Y_2O_3$, and at least one of $ZrO_2$ or $HfO_2$, based on the total weight of the glass-ceramic particulate (and/or crystalline material, respectively).

17B. The method of any of Exemplary Embodiments 1B to 11B, wherein the glass-ceramic particulate (and/or crystalline material) comprises, on a theoretical oxides basis, at least two of $Al_2O_3$, $Y_2O_3$, $ZrO_2$, $HfO_2$, $Ga_2O_3$, REO, $Bi_2O_3$, MgO, $Nb_2O_5$, $Ta_2O_5$, CaO, or at least one transition metal oxide (e.g., e.g., oxides of Sc, Ti, V, Cr, Mn, Fe, Co, Ni, Cu, and Zn, and complex metal oxides thereof).

18B. The method of any of preceding B Exemplary Embodiment, wherein the glass-ceramic particulate (and/or crystalline material) collectively comprises, on a theoretical oxides basis, not more than 20 (in some embodiments, 15, 10, 5, 4, 3, 2, 1, or even 0) percent by weight $B_2O_3$, CaO, $GeO_2$, $SiO_2$, and $TeO_2$, based on the total weight of the glass-ceramic particulate (and/or crystalline material, respectively).

19B. The method of any of preceding B Exemplary Embodiment, wherein the glass-ceramic particulate (and/or crystalline material) collectively comprises, on a theoretical oxides basis, not more than 20 (in some embodiments, 15, 10, 5, 4, 3, 2, 1, or even 0) percent by weight $As_2O_3$, $B_2O_3$, $GeO_2$, $P_2O_5$, $SiO_2$, $TeO_2$, and $V_2O_5$, based on the total weight of the glass-ceramic particulate (and/or crystalline material, respectively).

20B. The method of any preceding B Exemplary Embodiment, wherein the glass-ceramic particulate (and/or crystalline material) comprises at least one complex metal oxide (e.g., a complex $Al_2O_3$.metal oxide, a complex $Al_2O_3$.REO, and/or a complex $Al_2O_3$.$Y_2O_3$).

21B. The method of any preceding B Exemplary Embodiment, wherein the heating is conducted at a temperature at least 100 (in some embodiments at least 150, 200, 250, 300, 350 or even 400; in some embodiments in a range from 100 to 400, 200 to 400, 200 to 300, or even 250 to 350) ° C. above the crystallization temperature, $T_x$, of the glass in the glass-ceramic.

22B. The method of any preceding B Exemplary Embodiment, wherein the embodiment has x, y, and z dimensions each perpendicular to each other, and wherein each of the x, y, and z dimensions is at least 0.5 (in some embodiments at least 1, 2, 3, 4 or even at least 5) millimeters. In some embodiments, the x and y dimensions are at least 1, 2, 3, 4, or even at least 5 millimeters, and the z dimension is at least 0.1, 0.2, 0.3, 0.4 or even at least 0.5 millimeter.

23B. The method of any preceding B Exemplary Embodiment, wherein the article is an electronics enclosure (e.g., a watch case, cellular phone case, or a tablet case).

24B. An article made according any preceding B Exemplary Embodiment.

1C. A method of forming an article comprising:
providing a preform having a volume and a first shape, the preform comprising nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic);
providing a mold comprising a cavity having a void volume in the range of 70 to 130 percent of the volume of the preform;
placing at least a portion of the preform within the void volume of the mold; and
heating the preform at sufficient temperature and sufficient pressure to form an article comprising crystalline material and having a second, different shape.

2C. The method of Exemplary Embodiment 1C, wherein at least 90 (in some embodiments, at least 91, 92, 93, 94, 95, 96, 97, 98, 99, 99.5, 99.9, or even 100) percent by weight of the nanocrystalline glass-ceramic, based on the total weight of the glass-ceramic, does not have a $T_g$.

3C. The method of any preceding C Exemplary Embodiment, wherein the first shape is planar.

4C. The method of any preceding C Exemplary Embodiment, wherein the void volume of the cavity is at least 10 mm³.

5C. The method of any preceding C Exemplary Embodiment, wherein the cavity in the mold has a void volume in the range of 90 to 105 percent of the volume of the preform.

6C. The method of any preceding C Exemplary Embodiment, wherein the mold further comprises at least one cavity port in fluid connection with the cavity.

7C. The method of any preceding C Exemplary Embodiment, wherein the nanocrystalline glass-ceramic (and/or crystalline material) contains, on a theoretical oxides basis, no greater than 40 (in some embodiments, 35, 30, 25, 20, 15, 10, 5, 4, 3, 2, 1, or even 0) percent by weight $SiO_2$, based on the total weight of the nanocrystalline glass-ceramic (and/or crystalline material, respectively).

8C. The method of any preceding C Exemplary Embodiment, wherein the nanocrystalline glass-ceramic (and/or crystalline material) collectively contains, on a theoretical oxides basis, less than 40 (in some embodiments, 35, 30, 25, 20, 15, 10, 5, 4, 3, 2, 1, or even 0) percent by weight $SiO_2$, $B_2O_3$, and $P_2O_5$, based on the total weight of the nanocrystalline glass-ceramic (and/or crystalline material, respectively).

9C. The method of any preceding C Exemplary Embodiment, wherein the heating is conducted in a range from 1000° C. to 1300° C. (in some embodiments, in a range from 1050° C. to 1300° C., 1100° C. to 1300° C., 1150° C. to 1300° C., 1150° C. to 1250° C., or even 1200° C. to 1300° C.).

10C. The method of any preceding C Exemplary Embodiment, wherein at least a portion of the heating is conducted at pressure at least 0.1 MPa (in some embodiments, at least 0.2 MPa, 0.5 MPa, 1 MPa, 5 MPa, 10 MPa, 25 MPa, 50 MPa, 100 MPa, or even at least 200 MPa; in some embodiments, in a range from 0.1 MPa to 200 MPa, 0.2 MPa to 200 MPa, 0.5 MPa to 200 MPa, 1 MPa to 200 MPa, 5 MPa to 200 MPa, or even 10 MPa to 200 MPa).

11C. The method of any preceding C Exemplary Embodiment, wherein the heating is conducted for a time of at least 30 seconds (in some embodiments, at least 45 seconds, 1 minute, or even at least 1 hour; in some embodiments, in a range from 30 seconds to 1 hour, 45 seconds to 1 hour, or even 1 minute to 1 hour).

12C. The method of any preceding C Exemplary Embodiment, wherein the crystalline material has an average crystallite size of at least 20 nanometers (nm), 25 nm, 30 nm, 35 nm, 40 nm, 45 nm, 50 nm, 55 nm, 60 nm, 65 nm, 70 nm, 75 nm, 100 nm, 150 nm, 200 nm, or even at least 300 nm; in some embodiments, in a range from 20 nm to 300 nm (in some embodiments, in a range from 20 nm to 200 nm, 20 nm to 100 nm, 20 nm to 75 nm, or even 20 nm to 60 nm).

13C. The method of any of Exemplary Embodiments 1C to 11C, wherein the crystalline material is nanocrystalline.

14C. The method of any preceding C Exemplary Embodiment, wherein the nanocrystalline glass-ceramic (and/or crystalline material) comprises, on a theoretical oxides basis, $Al_2O_3$ (in some embodiments, at least 20, 25, 30, 35, 40, 45, 50, 55, 60, 65, 70, 75, 80, or even at least 85; in some embodiments, in a range from 20 to 85, 25 to 85, 35, to 85, or even 50 to 85) percent by weight $Al_2O_3$, based on the total weight of the nanocrystalline glass-ceramic (and/or crystalline material, respectively).

15C. The method of any of Exemplary Embodiments 1C to 13C, wherein the nanocrystalline glass-ceramic (and/or crystalline material) comprises, on a theoretical oxides basis, $Al_2O_3$, REO, and at least one of $ZrO_2$ or $HfO_2$.

16C. The method of Exemplary Embodiment 15C, wherein the nanocrystalline glass-ceramic (and/or crystalline material) collectively comprises, on a theoretical oxides basis, at least 70 (in some embodiments, at least 75, 80, 85, 90, 95, 96, 97, 98, 99, 99.5, or even 100) percent by weight of the $Al_2O_3$, REO, and at least one of $ZrO_2$ or $HfO_2$, based on the total weight of the nanocrystalline glass-ceramic (and/or crystalline material, respectively).

17C. The method of any of Exemplary Embodiments 1C to 13C, wherein the nanocrystalline glass-ceramic (and/or crystalline material) comprises, on a theoretical oxides basis, $Al_2O_3$, $Y_2O_3$, and at least one of $ZrO_2$ or $HfO_2$.

18C. The method of Exemplary Embodiment 17C, wherein the nanocrystalline glass-ceramic (and/or crystalline material) collectively comprises, on a theoretical oxides basis, at least 70 (in some embodiments, at least 75, 80, 85, 90, 95, 96, 97, 98, 99, 99.5, or even 100) percent by weight of the $Al_2O_3$, $Y_2O_3$, and at least one of $ZrO_2$ or $HfO_2$, based on the total weight of the nanocrystalline glass-ceramic (and/or crystalline material, respectively).

19C. The method of any of Exemplary Embodiments 1C to 13C, wherein the nanocrystalline glass-ceramic (and/or crystalline material) comprises, on a theoretical oxides basis, at least two of $Al_2O_3$, $Y_2O_3$, $ZrO_2$, $HfO_2$, $Ga_2O_3$, REO, $Bi_2O_3$, MgO, $Nb_2O_5$, $Ta_2O_5$, CaO, or at least one transition metal oxide (e.g., oxides of Sc, Ti, V, Cr, Mn, Fe, Co, Ni, Cu, and Zn, and complex metal oxides thereof).

20C. The method of any of preceding C Exemplary Embodiment, wherein the nanocrystalline glass-ceramic (and/or crystalline material) collectively comprises, on a theoretical oxides basis, not more than 20 (in some embodiments, 15, 10, 5, 4, 3, 2, 1, or even 0) percent by weight $B_2O_3$, CaO, $GeO_2$, $SiO_2$, and $TeO_2$, based on the total weight of the nanocrystalline glass-ceramic (and/or crystalline material, respectively).

21C. The method of any of preceding C Exemplary Embodiment, wherein the nanocrystalline glass-ceramic (and/or crystalline material) collectively comprises, on a theoretical oxides basis, not more than 20 (in some embodiments, 15, 10, 5, 4, 3, 2, 1, or even 0) percent by weight $As_2O_3$, $B_2O_3$, $GeO_2$, $P_2O_5$, $SiO_2$, $TeO_2$, and $V_2O_5$, based on the total weight of the nanocrystalline glass-ceramic (and/or crystalline material, respectively).

22C. The method of any preceding C Exemplary Embodiment, wherein the nanocrystalline glass-ceramic (and/or crystalline material) comprises at least one complex metal oxide (e.g., a complex $Al_2O_3$.metal oxide, a complex $Al_2O_3$.REO, and/or a complex $Al_2O_3$.$Y_2O_3$).

23C. The method of any preceding C Exemplary Embodiment, wherein the heating is conducted at a temperature at least 100 (in some embodiments at least 150, 200, 250, 300, 350 or even 400; in some embodiments in a range from 100 to 400, 200 to 400, 200 to 300, or even 250 to 350) ° C. above the crystallization temperature of the glass in the glass-ceramic.

24C. The method of any preceding C Exemplary Embodiment, wherein the embodiment has x, y, and z dimensions each perpendicular to each other, and wherein each of the x, y, and z dimensions is at least 0.5 (in some embodiments at least 1, 2, 3, 4 or even at least 5) millimeters. In some embodiments, the x and y dimensions are at least 1, 2, 3, 4, or even at least 5 millimeters, and the z dimension is at least 0.1, 0.2, 0.3, 0.4 or even at least 0.5 millimeter.

25C. The method of any preceding C Exemplary Embodiment, wherein the article is an electronics enclosure (e.g., a watch case, cellular phone case, or a tablet case).

26C. An article made according to the method of any preceding C Exemplary Embodiment.

1D. A method of forming an article comprising:
providing a preform having a volume and a first shape, the preform comprising nanocrystalline (i.e., crystals not greater than 100 nanometers; in some embodiments, not greater 90, 80, 75, 70, 65, 60, 55, 50, 45, 40, 35, 30, 25, or even 20 nanometers) glass-ceramic (i.e., glass-ceramic comprised of at least 90 (in some embodiments, at least 91, 92, 92.5, 94, 95, 96, 97, 97.5, 98, 99, 99.5, 99.6, 99.7, 99.8, or even at least 99.9) percent by volume nanocrystals, based on the total volume of the nanocrystalline glass-ceramic;
providing a major surface;
placing at least a portion of the preform in contact with the major surface; and
heating the preform at sufficient temperature and sufficient pressure to form an article comprising crystalline material and having a second, different shape.

2D. The method of Exemplary Embodiment 1D, further comprising:
providing a second major surface opposing the first major surface; and
placing at least a portion of the preform into contact with the second major surface.

3D. The method of either Exemplary Embodiment 1D or 2D, wherein the first shape is planar.

4D. The method of any preceding D Exemplary Embodiment, wherein at least 90 (in some embodiments, at least 91, 92, 93, 94, 95, 96, 97, 98, 99, 99.5, 99.9, or even 100) percent by weight of the nanocrystalline glass-ceramic, based on the total weight of the glass-ceramic, does not have a $T_g$.

5D. The method of any preceding D Exemplary Embodiment, wherein the nanocrystalline glass-ceramic (and/or crystalline material) contains, on a theoretical oxides basis, no greater than 40 (in some embodiments, 35, 30, 25, 20, 15, 10, 5, 4, 3, 2, 1, or even 0) percent by weight $SiO_2$, based on the total weight of the nanocrystalline glass-ceramic (and/or crystalline material, respectively).

6D. The method of any preceding D Exemplary Embodiment, wherein the nanocrystalline glass-ceramic (and/or crystalline material) collectively contains, on a theoretical oxides basis, less than 40 (in some embodiments, 35, 30, 25, 20, 15, 10, 5, 4, 3, 2, 1, or even 0) percent by weight $SiO_2$, $B_2O_3$, and $P_2O_5$, based on the total weight of the nanocrystalline glass-ceramic (and/or crystalline material, respectively).

7D. The method of any preceding D Exemplary Embodiment, wherein the heating is conducted in a range from 1000° C. to 1300° C. (in some embodiments, in a range from 1050° C. to 1300° C., 1100° C. to 1300° C., 1150° C. to 1300° C., 1150° C. to 1250° C., or even 1200° C. to 1300° C.).

8D. The method of any preceding D Exemplary Embodiment, wherein at least a portion of the heating is conducted at pressure at least 0.1 MPa (in some embodiments, at least 0.2 MPa, 0.5 MPa, 1 MPa, 5 MPa, 10 MPa, 25 MPa, 50 MPa, 100 MPa, or even at least 200 MPa; in some embodiments, in a range from 0.1 MPa to 200 MPa, 0.2 MPa to 200 MPa, 0.5 MPa to 200 MPa, 1 MPa to 200 MPa, 5 MPa to 200 MPa, or even 10 MPa to 200 MPa).

9D. The method of any preceding D Exemplary Embodiment, wherein the heating is conducted for a time of at least 30 seconds (in some embodiments, at least 45 seconds, 1 minute, or even at least 1 hour; in some embodiments, in a range from 30 seconds to 1 hour, 45 seconds to 1 hour, or even 1 minute to 1 hour).

10D. The method of any preceding D Exemplary Embodiment, wherein the crystalline material has an average crystallite size of at least 20 nanometers (nm), 25 nm, 30 nm, 35 nm, 40 nm, 45 nm, 50 nm, 55 nm, 60 nm, 65 nm, 70 nm, 75 nm, 100 nm, 150 nm, 200 nm, or even at least 300 nm; in some embodiments, in a range from 20 nm to 300 nm (in some embodiments, in a range from 20 nm to 200 nm, 20 nm to 100 nm, 20 nm to 75 nm, or even 20 nm to 60 nm).

11D. The method of any of Exemplary Embodiments 1D to 9D, wherein the crystalline material is nanocrystalline.

12D. The method of any preceding D Exemplary Embodiment, wherein the nanocrystalline glass-ceramic (and/or crystalline material) comprises, on a theoretical oxides basis, $Al_2O_3$ (in some embodiments, at least 20, 25, 30, 35, 40, 45, 50, 55, 60, 65, 70, 75, 80, or even at least 85; in some embodiments, in a range from 20 to 85, 25 to 85, 35, to 85, or even 50 to 85) percent by weight $Al_2O_3$, based on the total weight of the nanocrystalline glass-ceramic (and/or crystalline material, respectively).

13D. The method of any of Exemplary Embodiments 1D to 11D, wherein the nanocrystalline glass-ceramic (and/or crystalline material) comprises, on a theoretical oxides basis, $Al_2O_3$, REO, and at least one of $ZrO_2$ or $HfO_2$.

14D. The method of Exemplary Embodiment 13D, wherein the nanocrystalline glass-ceramic (and/or crystalline material) collectively comprises, on a theoretical oxides basis, at least 70 (in some embodiments, at least 75, 80, 85, 90, 95, 96, 97, 98, 99, 99.5, or even 100) percent by weight of the $Al_2O_3$, REO, and at least one of $ZrO_2$ or $HfO_2$, based on the total weight of the nanocrystalline glass-ceramic (and/or crystalline material, respectively).

15D. The method of any of Exemplary Embodiments 1D to 11D, wherein the nanocrystalline glass-ceramic (and/or crystalline material) comprises, on a theoretical oxides basis, $Al_2O_3$, $Y_2O_3$, and at least one of $ZrO_2$ or $HfO_2$.

16D. The method of Exemplary Embodiment 15D, wherein the nanocrystalline glass-ceramic (and/or crystalline material) collectively comprises, on a theoretical oxides basis, at least 70 (in some embodiments, at least 75, 80, 85, 90, 95, 96, 97, 98, 99, 99.5, or even 100) percent by weight of the $Al_2O_3$, $Y_2O_3$, and at least one of $ZrO_2$ or $HfO_2$, based on the total weight of the nanocrystalline glass-ceramic (and/or crystalline material, respectively).

17D. The method of any of Exemplary Embodiments 1D to 11D, wherein the nanocrystalline glass-ceramic (and/or crystalline material) comprises, on a theoretical oxides basis, at least two of $Al_2O_3$, $Y_2O_3$, $ZrO_2$, $HfO_2$, $Ga_2O_3$, REO, $Bi_2O_3$, MgO, $Nb_2O_5$, $Ta_2O_5$, CaO, or at least one transition metal oxide (e.g., oxides of Sc, Ti, V, Cr, Mn, Fe, Co, Ni, Cu, and Zn, and complex metal oxides thereof).

18D. The method of any preceding D Exemplary Embodiment, wherein the nanocrystalline glass-ceramic (and/or crystalline material) collectively comprises, on a theoretical oxides basis, not more than 20 (in some embodiments, 15, 10, 5, 4, 3, 2, 1, or even 0) percent by weight $B_2O_3$, CaO, $GeO_2$, $SiO_2$, and $TeO_2$, based on the total weight of the nanocrystalline glass-ceramic (and/or crystalline material, respectively).

19D. The method of any preceding D Exemplary Embodiment, wherein the nanocrystalline glass-ceramic (and/or crystalline material) collectively comprises, on a theoretical oxides basis, not more than 20 (in some embodiments, 15, 10, 5, 4, 3, 2, 1, or even 0) percent by weight $As_2O_3$, $B_2O_3$, $GeO_2$, $P_2O_5$, $SiO_2$, $TeO_2$, and $V_2O_5$, based on the total weight of the nanocrystalline glass-ceramic (and/or crystalline material, respectively).

20D. The method of any preceding D Exemplary Embodiment, wherein the nanocrystalline glass-ceramic (and/or crystalline material) comprises at least one complex metal oxide (e.g., a complex $Al_2O_3$.metal oxide, a complex $Al_2O_3$.REO, and/or a complex $Al_2O_3$.$Y_2O_3$).

21D. The method of any preceding D Exemplary Embodiment, wherein the heating is conducted at a temperature at least 100 (in some embodiments at least 150, 200, 250, 300, 350 or even 400; in some embodiments in a range from 100 to 400, 200 to 400, 200 to 300, or even 250 to 350) ° C. above the crystallization temperature of the glass in the glass-ceramic.

22D. The method of any preceding D Exemplary Embodiment, wherein the embodiment has x, y, and z dimensions each perpendicular to each other, and wherein each of the x, y, and z dimensions is at least 0.5 (in some embodiments at least 1, 2, 3, 4 or even at least 5) millimeters. In some embodiments, the x and y dimensions are at least 1, 2, 3, 4, or even at least 5 millimeters, and the z dimension is at least 0.1, 0.2, 0.3, 0.4 or even at least 0.5 millimeter.

23D. The method of any preceding D Exemplary Embodiment, wherein the article is an electronics enclosure (e.g., a watch case, cellular phone case, or a tablet case).

24D. An article made according to the method of any preceding D Exemplary Embodiment.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

A 12-gallon (about 45-liters) mixer was charged with 53 kilograms of powders (as shown in Table 1), 27 kilograms of water, and 1.6 kilogram of dispersant (obtained from GEO Specialty Chemicals, Ampler, Pa., under trade designation "DAXAD 30") and were high-shear mixed using a high-shear mixer (obtained under the trade designation "15 HP DISPERSER" from Hockmeyer, Harrison, N.J.) for 15 minutes at 2000 rpm. The material was then filled into 5-gallon (18.9-liter) buckets and allowed to sit overnight to complete the exotherm caused by the combination of $La_2O_3$ and water.

The resulting slurry was then twice passed through a high-energy bead mill (obtained from Netzsch Instruments, Selb, Germany, as Model LMZ2) loaded with 0.5-millimeter yttria stabilized zirconia (YSZ) milling media (obtained from Tosoh, Tokyo, Japan) rotating at 2000 rounds per minute (rpm) at 400 grams per minute to achieve intimate mixing and reduce the $90^{th}$ percentile of the particle size distribution below 1 micrometer.

TABLE 1

| Material | Amount, grams | Description |
|---|---|---|
| $La_2O_3$ | 23,000 | Lanthana powder, 1.2 micrometer particle size, 99.99% purity, obtained from Treibacher Industrie AG, Althofen, Austria |
| $SiO_2$ | 630 | Silica powder, 0.3 micrometer particle size, 99.7% purity, obtained from Vitro Minerals, Jackson, TN, under trade designation "RS50" |
| $Al_2O_3$ | 20,000 | Alumina powder, 1.0 micrometer particle size, 99.7% purity, obtained from Almatis GmbH, Bauxite, AR, under trade designation "A1000" |
| $ZrO_2$ | 8,600 | Zirconia powder, 40 nanometer particle size, 99.5% purity, obtained from Tosoh, Tokyo, Japan under trade designation "HSY-3" |

About 20 kilograms of slurry was spray-dried (obtained from SDS Spray Drying, Randallstown, Md., as Model 48) and screened to provide agglomerates with sizes ranging from about 63 to 180 micrometers. The spray dryer was 4 feet (1.2 meters) in diameter with 8 foot (2.4 meters) straight sides. The spray dryer was operated in open mode (the system was not closed loop—air was introduced into the heater via a 1 horse power blower (obtained from Air Tech Inc., Englewood, N.J.) and exhausted directly after exiting the baghouse. During operation the bulk drying gas was heated via an electric heater and carried through the drying chamber (entered through the top and exited through the bottom) and finally to a cyclone and a baghouse. The cyclone separated the product solids from the gas stream; the solids collected in the baghouse were discarded. The bulk drying gas temperature at the drying chamber inlet was about 180° C. while the outlet of the drying chamber was about 100° C. The slurry was provided at about 117 grams per minute via a pneumatic peristaltic pump (obtained from Masterflex, Vernon Hills, Ill., under the trade designation "96410-25") with two platinum-cured silicone tubing lines in parallel. The slurry was atomized vertically upward utilizing internally mixed two-fluid pressure spray atomizing nozzles (obtained from Spraying Systems Co., Wheaton, Ill., under the trade designations "FLUID CAP 60100" and "AIR CAP 170"). The atomizing gas was nitrogen, provided at about 10 psi (0.07 MPa) and 3.3 standard cubic feet per minute (90 standard liters per minute (SLPM)).

A portion of the spray-dried particles was fed into a hydrogen/oxygen torch flame to generate melted glass beads. The torch used to melt the particles was a bench burner (obtained from Bethlehem Apparatus Co., Hellertown, Pa., under trade designation "PM2D MODEL B"). The flows of hydrogen and oxygen were set at the following rates. For the inner ring, the hydrogen flow rate was 8 SLPM and the oxygen flow rate was 3 SLPM. For the outer ring, the hydrogen flow rate was 23 SLPM and the oxygen flow rate was 9.8 SLPM. The dried and sized particles were fed directly into the torch flame, where they were melted and transported to an inclined stainless-steel surface (about 51 centimeters (20 inches) wide with the slope angle of 45 degrees) with cold water running (about 8 liters/minute) over the surface to form quenched beads.

The resulting quenched beads were collected in a pan and dried at 110° C. The beads were transparent and spherical in shape.

For differential thermal analysis (DTA), a fraction of the bead material was screened to retain the 90-125 micrometer size range. DTA runs were made using thermal analysis equipment (obtained from Netzsch Instruments under the trade designation "NETZSCH DSC 404F1"). The amount of each screened sample (100 milligrams) placed in a platinum sample pan. Each sample was heated in static air at a rate of 20° C./minute from room temperature (about 25° C.) to 1600° C.

Figure 6:
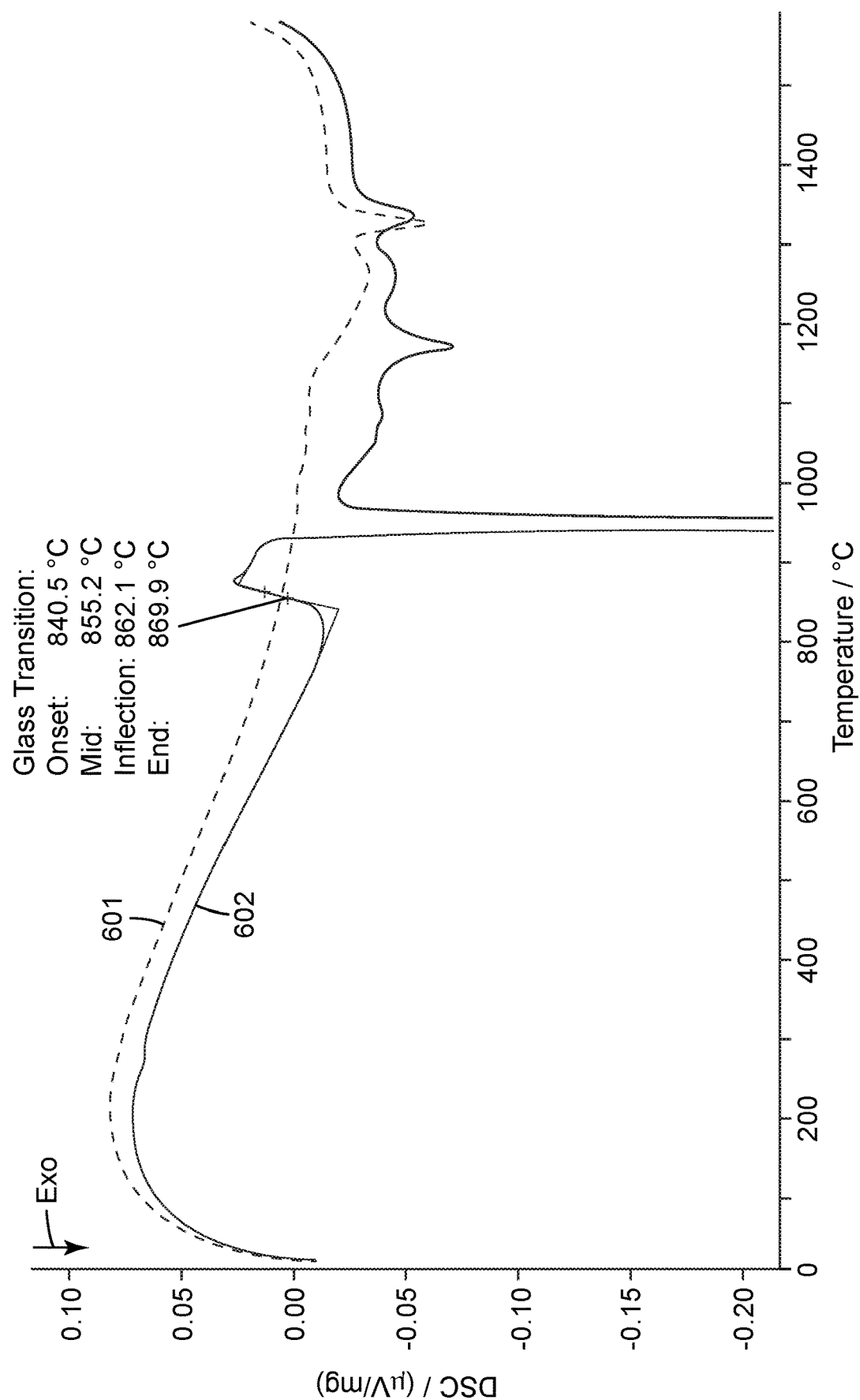
FIG. 6 shows differential thermal analysis (DTA) scans of heat treated beads (line 601) and glass beads (line 602) of Example 1.

Referring to FIG. 6, line 602 is the plotted DTA data for the Example 1 glass bead material. Referring to FIG. 6, line 602, the material exhibited an endothermic event at temperature around 840° C. It was believed that this event was due to the glass transition, $T_g$, of the material. At about 934° C., an exothermic event was observed. It was believed that this event was due to the crystallization, $T_x$, of the material.

100 grams of the glass beads were placed in a furnace (obtained from Deltech Inc., Denver, Colo., as Model DT-31-FL6) and heat-treated at 1100° C. for 1 hour. Referring to FIG. 6, line 601 is the plotted DTA data for the Example 1 material heat-treated at 1100° C. Referring to FIG. 6, line 601, the material did not exhibit an endothermic event. This was the evidence that the heat-treated material did not have a $T_g$.

Grain size and degree of crystallinity of the heat-treated beads was determined by (Field Emission Scanning Electron Microscopy (FE-SEM) (obtained from Hitachi Ltd., Maidenhead, UK, under trade designation "HITACHI S-4800"). Fractured surfaces of heat-treated beads were coated by a thin layer of Au—Pd to make the sample conductive. Images (i.e., electron micrographs) were obtained while operating at 2.0 or 5.0 kilovolts with a magnification of 150,000 times. FE-SEM micrographs with 150,000 magnification were used for grain size measurement. Three or four micrographs taken from different areas of the sintered body were analyzed for each sample. Ten horizontal lines, which were spaced at roughly equal intervals across the height of a micrograph were drawn. The number of grain boundary intercepts observed on each line were counted and used to calculate the average distance between intercepts. The average distance for each line was multiplied by 1.56 to determine grain size and this value was averaged over all the lines for all micrographs of each sample. Average crystal size of heat-treated Example 1 material was determined to be 57 nm.

About 5 grams of the heat-treated beads were placed in a circular graphite die with an outside diameter of 160 millimeters, an inside diameter of 20 millimeters, and a height of 100 millimeters (graphite obtained from Mersen, St. Marys, Pa., and then machined to the specified inside dimensions) and hot-pressed using a uniaxial pressing apparatus (obtained from Thermal Technology Inc., Brea, Calif., under the trade designation "HP-50"). The hot-pressing was carried out at using continuous heating at 5° C./minute in an argon atmosphere and 13.8 megapascals (MPa) (2000 pounds per square inch (2 ksi)) pressure. Shrinkage displacement associated with densification was monitored. Initial shrinkage temperature was 1120° C. The shrinkage continued until temperature reached 1200° C. at which point the shrinkage stopped. The resulting consolidated disk was about 20 millimeters in diameter, and about 3 millimeters thick. Additional hot-press runs were performed to make additional disks.

The density of the resulting hot-pressed glass material was measured using a gas pycnometer (obtained from Micromeritics, Norcross, Ga., under the trade designation "ACCUPUYC 1330") and found to be 5.25 grams/cm$^3$, which is 99 percent of theoretical density.

The average microhardness of the resulting hot-pressed material was determined as follows. Pieces of the hot-pressed material (about 2-5 millimeters in size) were mounted in a mounting resin (obtained from Buehler Ltd., Lake Bluff, Ill., under the trade designation "EPOMET"). The resulting cylinder of resin was about 2.5 centimeter (1 inch) in diameter and about 1.9 centimeter (0.75 inch) tall (i.e., high). The mounted samples were polished using a conventional grinder/polisher (obtained from Buehler Ltd., under the trade designation "BETA") and conventional diamond slurries with the final polishing step using a 1 micrometer diamond slurry (obtained from Buehler Ltd., under the trade designation "METADI") to obtain polished cross-sections of the sample.

The microhardness measurements were made using a conventional microhardness tester (obtained from Mitutoyo Corporation, Tokyo, Japan, under the trade designation "MITUTOYO MVK-VL") fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The average microhardness of the hot-pressed material, based on an average of 5 measurements, was 15.4 gigapascals (GPa).

Example 2

The materials in the amounts listed in Table 2, below, were combined with 904 grams of water to provide a master batch aqueous suspension.

TABLE 2

| Material | Amount, grams | Description |
|---|---|---|
| Al$_2$O$_3$ | 541 | Alumina powder, 0.5 micrometer particle size, 99.8% purity, obtained from Alcoa AG, Point Comfort, TX, under trade designation "16-SG" |
| TiO$_2$ | 514 | Titania powder, 1.0 micrometer particle size, 98.5% purity, obtained from Kronos, Chelmsford, MA, under trade designation "KRONOS 1000" |
| Zircon | 339 | Zircon sand, 20 micrometer particle size, 98% purity, obtained from Reade, East Providence, RI |
| Talc | 267 | Magnesium silicate monohydrate powder, obtained from Alfa Aesar, 2 micrometer particle size, 99.5% purity, Ward Hill, MA |

TABLE 2-continued

| Material | Amount, grams | Description |
|---|---|---|
| Calcium Carbonate | 311 | Calcium carbonate powder, 99.5% purity, particle size of 3.2 micrometers, obtained from Huber Materials, Edison, NJ, under trade designation "G2" |
| Cell Gum | 24 | Sodium carboxymethylcellulose, 99.5% purity, obtained from Hercules Incorporated Aqualon Division, Wilmington, DE, under trade designation "7L2" |
| Dispersant | 39 | Sodium polymethacrylate solution, 99.5% purity, obtained from Geo Specialty Chemicals, Ambler, PA, under trade designation "DAXAD 30" |

The cell-gum was added to the water very slowly, and fully dissolved with 30 minutes of mixing with a high shear mixer (obtained from Hayward Gordon, Adelanto, Calif., under the trade designation "SCOTT TURBIN;" Model M1110SE") at 1800 rpm. Next, the dispersant was added before the powders were added individually. The mixture was then ball milled at 100 rpm in an aluminum oxide mill jar with 1 cm cylindrical alumina media (obtained from Glenn Mills, Clifton, N.J.) for 24 hours to make a homogeneous suspension with the 90$^{th}$ percentile of the particle size of under 2 micrometers.

The slurry was spray-dried ("Model 48") and screened to provide agglomerates with sizes ranging from about 63 to 180 micrometers.

A portion of the spray-dried particles was fed into a hydrogen/oxygen torch flame to generate melted glass beads. The torch used to melt the particles was a bench burner (obtained from Bethlehem Apparatus Co., Hellertown, Pa., under trade designation "PM2D MODEL B"). The flows of hydrogen and oxygen were set at the following rates. For the inner ring, the hydrogen flow rate was 8 standard liters per minute (SLPM) and the oxygen flow rate was 3 SLPM. For the outer ring, the hydrogen flow rate was 23 (SLPM) and the oxygen flow rate was 9.8 SLPM. The dried and sized particles were fed directly into the torch flame, where they were melted and transported to an inclined stainless-steel surface (about 51 centimeters (20 inches) wide with the slope angle of 45 degrees) with cold water running (about 8 liters/minute) over the surface to form quenched beads.

The resulting quenched beads were collected in a pan and dried at 110° C. The beads were transparent and spherical in shape.

100 grams of the flame-formed beads were placed in a furnace (Model DT-31-FL6), and heat-treated at 1050° C. for 1 hour with heating and cooling rates of 20° C. per minute.

About 5 grams of the heat-treated beads were placed in a circular graphite die with an outside diameter of 160 millimeters, an inside diameter of 20 millimeters, and a height of 100 millimeters (graphite obtained from Mersen), and then machined to the specified inside dimensions) and hot-pressed using a uniaxial pressing apparatus ("HP-50"). The hot-pressing was carried out using continuous heating at 5° C./minute in an argon atmosphere and 20 megapascals (MPa) (3000 pounds per square inch (3 ksi)) pressure. Shrinkage displacement associated with densification was monitored. Initial shrinkage temperature was 1110° C. The shrinkage continued until temperature reached 1210° C. at which point the shrinkage stopped. The resulting consolidated disk was about 20 millimeters in diameter, and about 3 millimeters thick. The disk had a density of 99 percent of theoretical density determined as described in Example 1.

Example 3

Example 3 samples were prepared as described for Example 2, except that the materials for aqueous the master batch are shown in Table 3, below.

TABLE 3

| Material | Amount, grams | Description |
|---|---|---|
| $Al_2O_3$ | 811 | Alumina powder, 0.5 micrometer particle size, 99.8% purity, obtained from Alcoa AG, under trade designation "16-SG" |
| $SiO_2$ | 247 | Silica powder, 0.25 micrometer particle size, 99.5% purity, obtained from US Silica Co, Berkeley Springs, WV, under trade designation "Sil-co-Sil" |
| $ZrO_2$ | 913 | Zirconium (IV) oxide powder, 1.6 micrometer particle size, 98.7% purity, obtained from Z Tech LLC, Bow, NH under trade designation "CF-Plus-HM" |
| Cell Gum | 24 | Sodium carboxymethylcellulose, 99.5% purity, obtained from Hercules Incorporated Aqualon Division, under trade designation"7L2" |
| Dispersant | 39 | Sodium polymethacrylate Solution, 99.5% purity, obtained from Geo Specialty Chemicals under trade designation "DAXAD 30" |

100 grams of flame-formed beads were heated and hot-pressed as described in Example 2. About 5 grams of the heat-treated beads were placed in a circular graphite die with an outside diameter of 160 millimeters, an inside diameter of 20 millimeters, and a height of 100 millimeters (graphite obtained from Mersen, and machined to provide the specified inside dimensions) and hot-pressed using a uniaxial pressing apparatus ("HP-50"). The hot-pressing was carried out using continuous heating at 5° C./minute in an argon atmosphere and 20 megapascals (MPa) (3000 pounds per square inch (3 ksi)) pressure. Shrinkage displacement associated with densification was monitored. Initial shrinkage temperature was 1110° C. Initial shrinkage temperature was 1120° C. The shrinkage continued until temperature reached 1220° C. at which point the shrinkage stopped. The resulting consolidated disk was about 20 millimeters in diameter, and about 3 millimeters thick and was 99% of theoretical density, determined as described in Example 1.

Example 4

A flat, 0.7 millimeter thick sheet of glass was prepared by hot-pressing 50 grams of glass beads prepared as described in Example 1 in a 75-millimeter circular graphite die (obtained from Mersen) enclosed in a shroud obtained in a uniaxial pressing apparatus ("HP-50") at a temperature of 930° C. and a load of 20,000 kilograms for 40 minutes.

The puck was then polished down using a conventional grinder/polisher ("BETA") and conventional diamond slurries with the final polishing step using a 1 micrometer diamond slurry ("METADI") to obtain polished cross-sections of the sample to 0.7 millimeter and water-jet cut into a 58×44-millimeter sheet. The flat sheet was then placed between two flat alumina 100 by 80 mm sheets (obtained from Coorstek, Golden, Colo.) in a large box furnace (obtained from Carbolite Gero, Ltd., Newtown, Pa., under the trade designation "CARBOLITE RH1-1500") and heated using the following profile: 20° C. to 830° C. at 3° C./minute, held for 2 hours, 830° C. to 875° C. at 1°

C./minute, held for 2 hours, 875° C. to 900° C. at 1° C./minute, held for 2 hours, 900° C. to 1000° C. at 1° C./minute, held for 1 hour 1000° C. to 1150° C. at 3° C./minute, held at 1150° C. for 1 hour, and 1150° C. to 20° C. at 3° C./minute.

The average microhardness of the resulting nanocrystalline glass-ceramic sheet was measured as described in Example 1. The average microhardness, based on an average of 5 measurements, was 14 GPa.

The 44×58-millimeter nanocrystalline glass-ceramic sheet was then placed in a rectangular 3-dimensional (3D) graphite mold about 80×60 millimeter on the outside and 44×58 millimeter on the inside with a beveled edge resulting in a final molded glass height of about 2 millimeters (graphite obtained from Mersen, and machined to provide the specified inside dimensions) inside a hot press in a $N_2$ environment ("HP-50"). It was heated to 950° C. at a rate of 15° C./minutes, held at 950° C. for 1.5 hour, and then heated to 1200° C. at a rate of 10° C./minute. After 10 minutes at temperature 20 kilograms of load were applied to the sample.

Displacement of the press was tracked and whenever the part moved by 0.1 millimeter another 10 kilograms of load were applied up to a final load of 150 kilograms. The total displacement equaled 1.6 millimeter over an hour, after which the furnace was ramped down at 2° C./minutes to 800° C. and then at 15° C./minutes to room temperature.

The resulting three-dimensional part showed some discoloration from its interaction with the graphite mold. The density of the three-dimensional part was 99% of theoretical density as determined by Archimedes method according to ASTM D116-86 (2016).

To produce the final, white ceramic, the three-dimensional sheet was placed inside a furnace (Model DT-31-FL6) with 700 grams of mass provided by an alumina crucible (obtained from Coorstek) filled with 3 mm YSZ milling media (obtained from Tosoh, Tokyo, Japan) holding down the flat center to prevent buckling, and heated from room temperature to 1300° C. at a rate of 10° C. per minute, held at 1300° C. for 2 hours, and then ramped down to room temperature at 10° C./minute.

Example 5

A 0.6-millimeter thick flat glass sheet prepared as described in Example $_4$ was placed in a die to assist with 200 grams placed on top of the die to assist with slumping. It was heated to 800° C. in 20 minutes, held for 20 minutes at 800° C., heated to 823° C. in 10 minutes, held for 30 minutes at 823° C., ramped to 828° C. in 5 minutes, held at 828° C. for 30 minutes, and then cooled to room temperature in 30 minutes.

The sheet was then crystallized on a flat alumina sheet in a large box furnace ("CARBOLITE RH1-1500"). It was heated at 3° C./minute to 820° C., held for 2 hours at 820° C., ramped to 875° C. at 1° C./minute, held at 875° C. for 2 hours, heated to 900° C. at 1° C./minute, held at 900° C. for 2 hours, heated to 1200° C. at 1° C. per minute, held at 1200° C. for 2 hours, and cooled from 1200° C. to room temperature at 1° C. per minute. The density of the resulting three-dimensional shaped glass-ceramic sheet was 99% of theoretical density as determined by Archimedes density according to ASTM D116-86 (2016).

The three-dimensional glass-ceramic sheet with dimensions of about 44-millimeter wide and 58-millimeter long with rounded corners and having edges bent upward to provide a total part height of about 2 millimeters and further having a domed central region (first shape). The part was placed on a flat alumina block in a furnace (Model DT-31-FL6). A second alumina block about 50-millimeter wide and 37-millimeter long (obtained from Coorstek) and additional mass totaling 700 grams, provided by an alumina crucible (obtained from Coorstek filled with 3 mm YSZ milling media (obtained from Tosoh), (about 3 kPa pressure) was placed centrally on top of the glass-ceramic sheet. The furnace was heated to 1300° C. at a rate of 3.5° C. per minute, and held for 4 hours. After the heating process, the initially domed central region of the glass-ceramic was substantially flat (second shape).

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method for making an article comprising crystalline material, the method comprising:
   heating nanocrystalline glass-ceramic particulate at sufficient temperature and under sufficient pressure such that the nanocrystalline glass-ceramic particulate consolidates to form a shape having at least 90 percent of theoretical density; and
   cooling the consolidated shape to provide the article,
   wherein at least 90 percent by weight of the nanocrystalline glass-ceramic particulate, based on the total weight of the nanocrystalline glass-ceramic particulate, does not have a $T_g$.

2. The method of claim 1, wherein the nanocrystalline glass-ceramic particulate collectively contains less than 40 percent by weight collectively $SiO_2$, $B_2O_3$, and $P_2O_5$, based on the total weight of the nanocrystalline glass-ceramic particulate.

3. The method of claim 1, wherein the heating is conducted in a range from 1000° C. to 1300° C. and wherein the heating is conducted for a time of at least 30 seconds.

4. The method of claim 1, wherein the crystalline material has an average crystallite size of at least 20 nanometers.

5. The method of claim 1, wherein the nanocrystalline glass-ceramic particulate collectively comprises, on a theoretical oxides basis, at least 70 percent by weight of $Al_2O_3$, REO, and at least one of $ZrO_2$ or $HfO_2$, based on the total weight of the nanocrystalline glass-ceramic particulate.

6. The method of claim 1, wherein the nanocrystalline glass-ceramic particulate collectively comprises, on a theoretical oxides basis, at least 70 percent by weight of $Al_2O_3$, $Y_2O_3$, and at least one of $ZrO_2$ or $HfO_2$, based on the total weight of the nanocrystalline glass-ceramic particulate.

7. A method for making an article comprising crystalline material, the method comprising:
   heating glass-ceramic particulate having a microhardness of at least 9 GPa at sufficient temperature and under sufficient pressure such that glass-ceramic particulate consolidates forming a shape having at least 90 percent of theoretical density; and
   cooling the consolidated shape to provide the article,
   wherein at least 90 percent by weight of the glass-ceramic particulate, based on the total weight of the glass-ceramic particulate, does not have a $T_g$.

8. The method of claim 7, wherein the glass-ceramic particulate collectively contains less than 40 percent by weight collectively $SiO_2$, $B_2O_3$, and $P_2O_5$, based on the total weight of the glass-ceramic particulate.

9. The method of claim 7, wherein the heating is conducted in a range from 1000° C. to 1300° C. and wherein the heating is conducted for a time of at least 30 seconds.

10. The method of claim 7, wherein the crystalline material has an average crystallite size of at least 20 nanometers.

11. The method of claim 7, wherein the glass-ceramic particulate collectively comprises, on a theoretical oxides basis, at least 70 percent by weight of $Al_2O_3$, REO, and at least one of $ZrO_2$ or $HfO_2$, based on the total weight of the glass-ceramic particulate.

12. The method of claim 7, wherein the glass-ceramic particulate collectively comprises, on a theoretical oxides basis, at least 70 percent by weight of $Al_2O_3$, $Y_2O_3$, and at least one of $ZrO_2$ or $HfO_2$, based on the total weight of the glass-ceramic particulate.

* * * * *